(12) United States Patent
Häring et al.

(10) Patent No.: US 8,637,174 B2
(45) Date of Patent: Jan. 28, 2014

(54) PHOSPHONIC ACID-CONTAINING BLENDS AND PHOSPHONIC ACID-CONTAINING POLYMERS

(75) Inventors: Thomas Häring, Stuttgart (DE); Jochen Kerres, Ostfildern (DE); Frank Schönberger, Saarlouis (DE); Martin Hein, Stuttgart (DE)

(73) Assignee: Thomas Häring, Stuttgart (DE)

( * ) Notice: Subject to any disclaimer, the term of this patent is extended or adjusted under 35 U.S.C. 154(b) by 611 days.

(21) Appl. No.: 12/278,245

(22) PCT Filed: Feb. 5, 2007

(86) PCT No.: PCT/DE2007/000260
§ 371 (c)(1),
(2), (4) Date: Feb. 10, 2009

(87) PCT Pub. No.: WO2007/101415
PCT Pub. Date: Sep. 13, 2007

(65) Prior Publication Data
US 2009/0220843 A1     Sep. 3, 2009

(30) Foreign Application Priority Data
Feb. 3, 2006  (DE) .......................... 10 2006 005 782

(51) Int. Cl.
*H01M 8/10*     (2006.01)
(52) U.S. Cl.
USPC .............. 429/33; 429/46; 429/309; 521/27; 252/184; 204/279
(58) Field of Classification Search
USPC .............. 429/33, 46, 309; 521/27; 252/184; 204/279
See application file for complete search history.

(56) References Cited

U.S. PATENT DOCUMENTS

| | | | | |
|---|---|---|---|---|
| 4,728,460 A | * | 3/1988 | Ledent et al. | 562/14 |
| 4,937,367 A | * | 6/1990 | Castaldi et al. | 558/45 |
| 5,584,981 A | * | 12/1996 | Turner et al. | 204/536 |
| 2003/0216275 A1 | * | 11/2003 | Crump et al. | 510/309 |
| 2010/0047655 A1 | * | 2/2010 | Haring | 429/33 |

FOREIGN PATENT DOCUMENTS

WO   WO-2007/101415 A2  *  9/2007

* cited by examiner

*Primary Examiner* — Peter D Mulcahy
*Assistant Examiner* — Henry Hu
(74) *Attorney, Agent, or Firm* — Edward C. Kwok; Hogan Lovells US LLP

(57) ABSTRACT

Various blends and blend membranes from low-molecular hydroxymethylene-oligo-phosphonic acids $R\text{---}C(PO_3H_2)_x(OH)_y$, and polymers, the group R representing any organic group, the polymers containing cation exchanger groups or their nonionic precursors of the type $SO_2X$, X being a halogen, OH, OMe, $NR_1R_2$, $OR_1$ with Me being any metal cation or ammonium cation, $R_1$, $R_2$ being H or any aryl- or alkyl group, $PDX_2$, COX and/or basic groups such as primary, secondary or tertiary amino groups, imidazole groups, pyridine groups, pyrazole groups etc. and/or OH groups. Such membranes may also include polymers that are modified with the 1-hydroxymethylene-1,1-bisphosphonic acid group. The polymers may be formed by reacting polymers which contain carboxylic acid groups or carboxylic halide groups —COHal (Hal=F, Cl, Br, I) with phosphite compounds or by reacting polymeric aldehydes or polymeric keto compounds with phosphite esters while carrying out an amine catalysis, an oxidation of the intermediary hydroxyphosphonic acid with $MnO_2$ or another oxidant.

11 Claims, 33 Drawing Sheets

Ionical Cross-linking between low-molecular hydroxymethylenebisphosphonic acid and the sulfonic acid groups of an ionomer

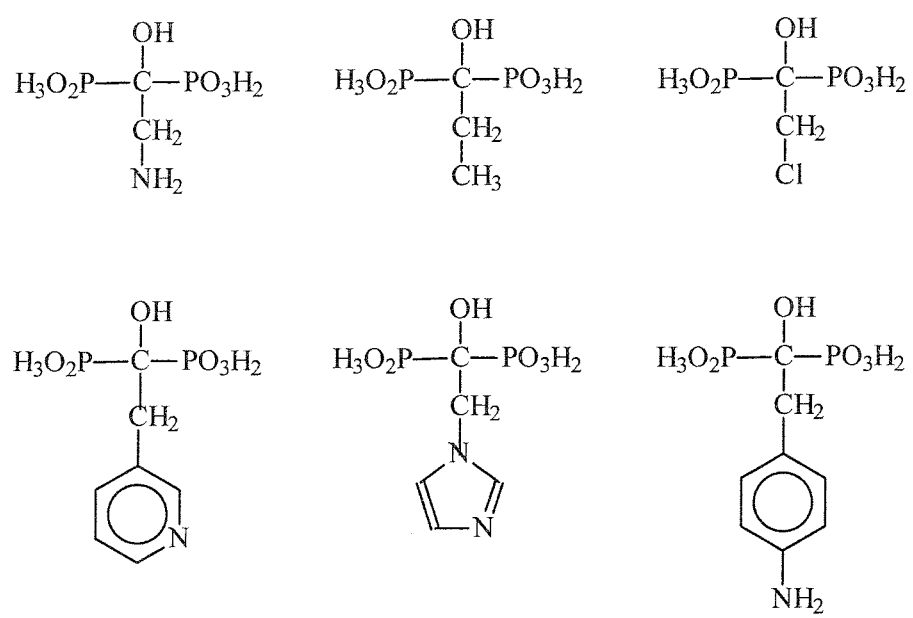
Figure 1: Preferred 1-hydroxymethylene-1,1-bisphosphonic acids, to be prepared from the respective carboxylic acids via reaction with $PCl_3/H_3PO_3$ and subsequent hydrolysis

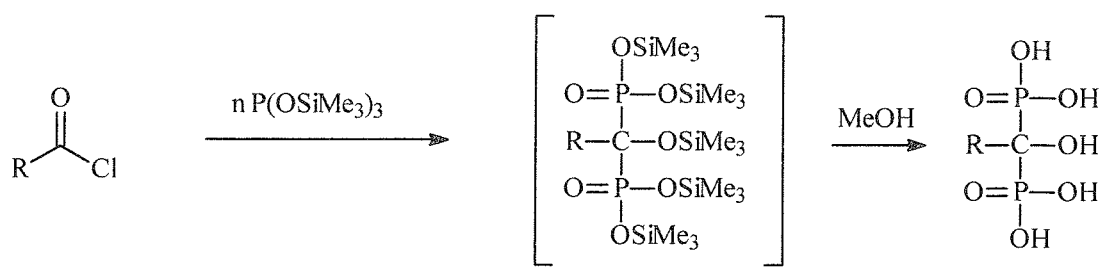
Figure 2: preparation procedure of 1-hydroxymethylenebisphosphonic acids from reaction of carboxylic acid chlorides with tris(trimethylsilylphosphite)

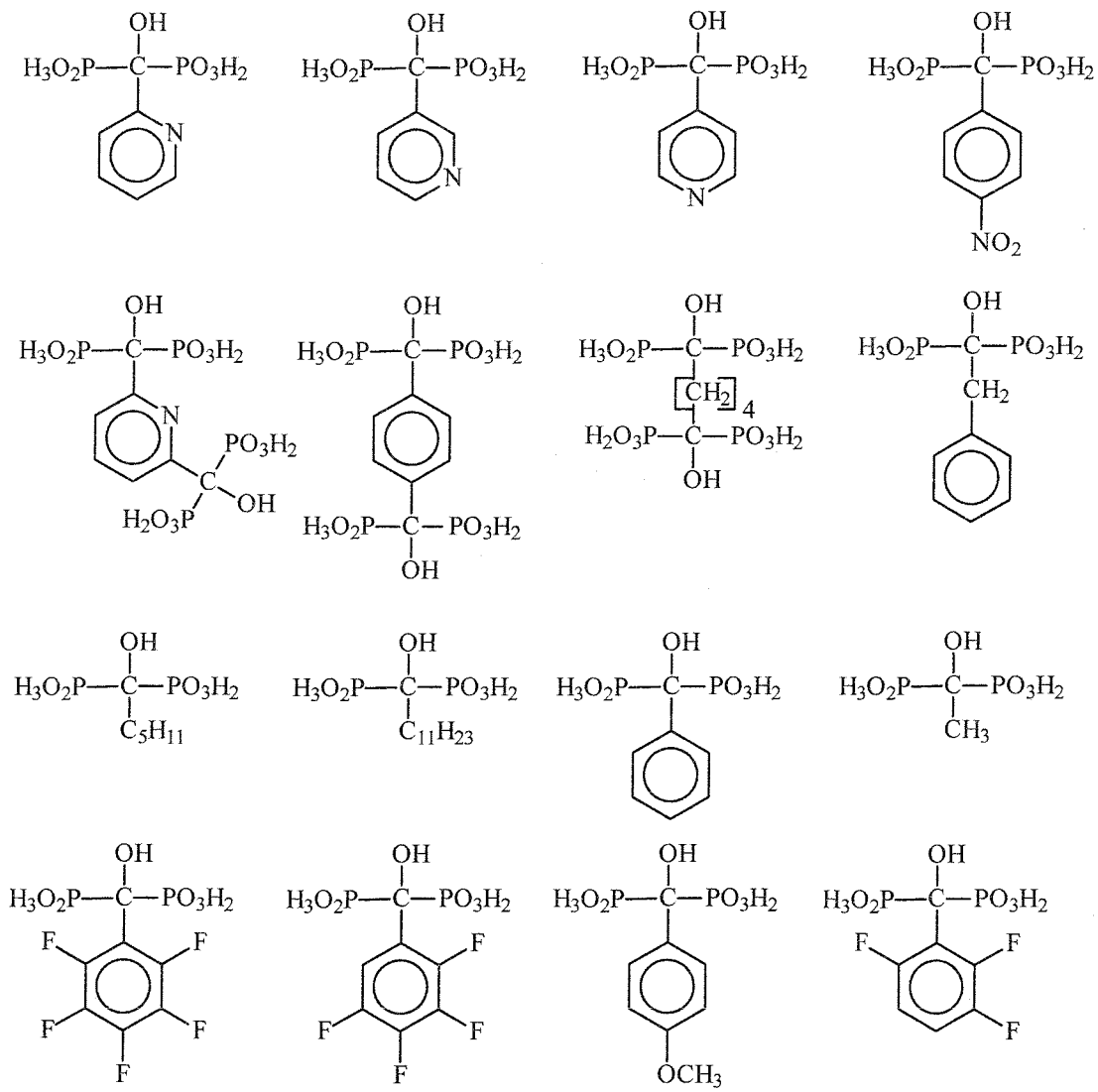
Figure 3: 1-Hydroxymethylenebisphosphonic acids prepared via reaction of carboxylic acid chlorides with tris(trimethylsilylphosphite)

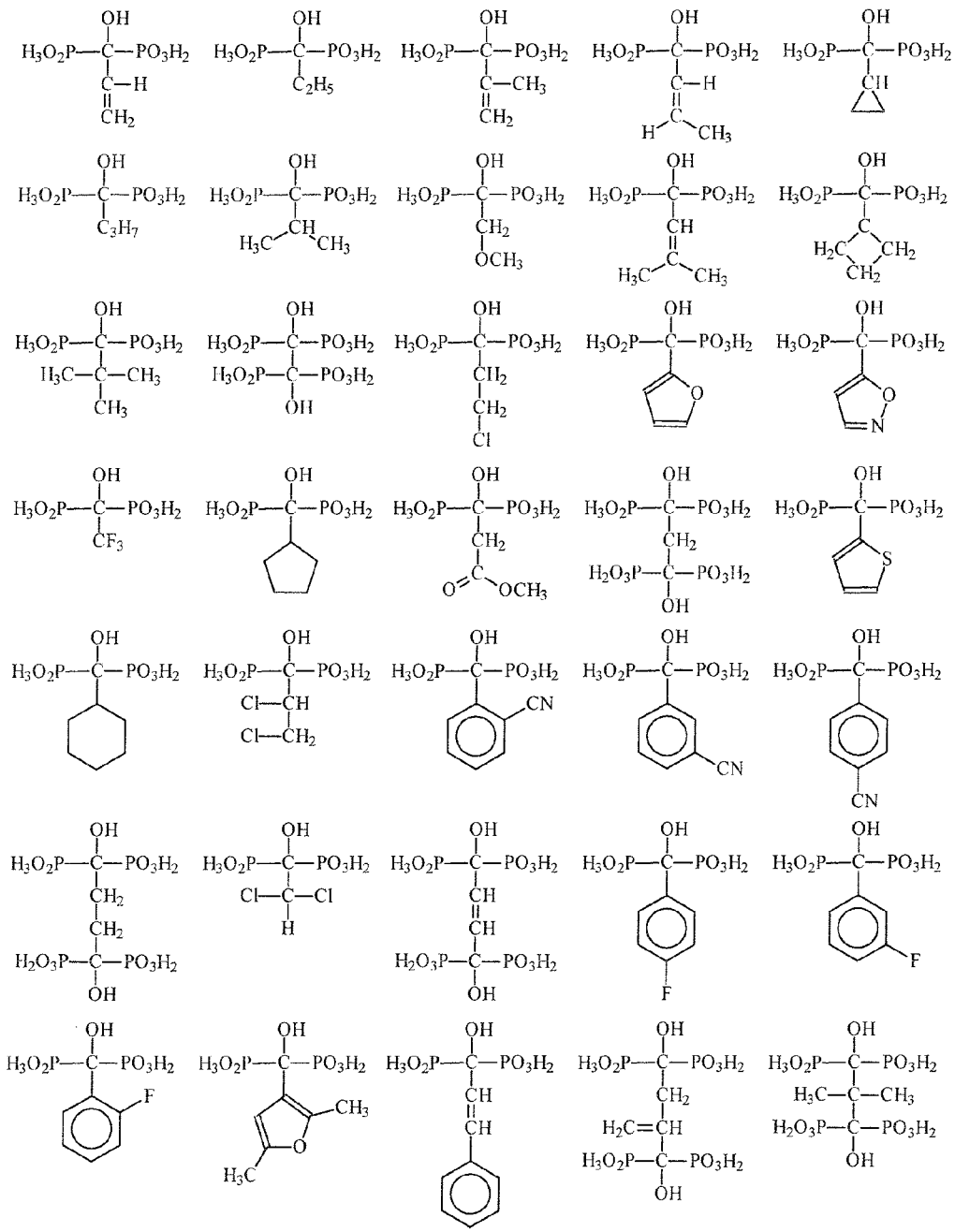
Figure 4: 1-Hydroxymethylenebisphosphonic acids prepared via reaction of carboxylic acid chlorides with tris(trimethylsilylphosphite) (continued)

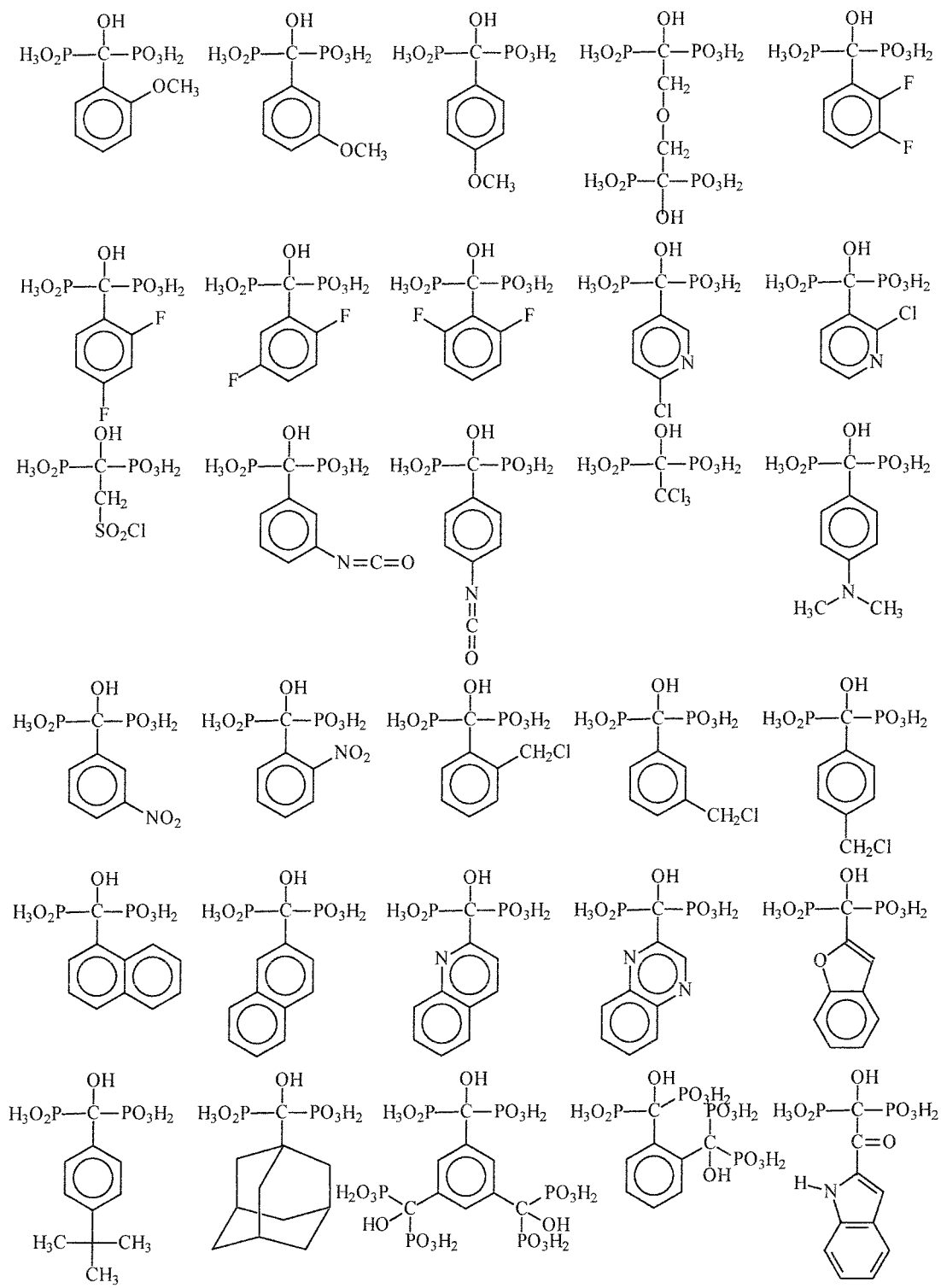
Figure 5: 1-Hydroxymethylenebisphosphonic acids prepared via reaction of carboxylic acid chlorides with tris(trimethylsilylphosphite) (continued)

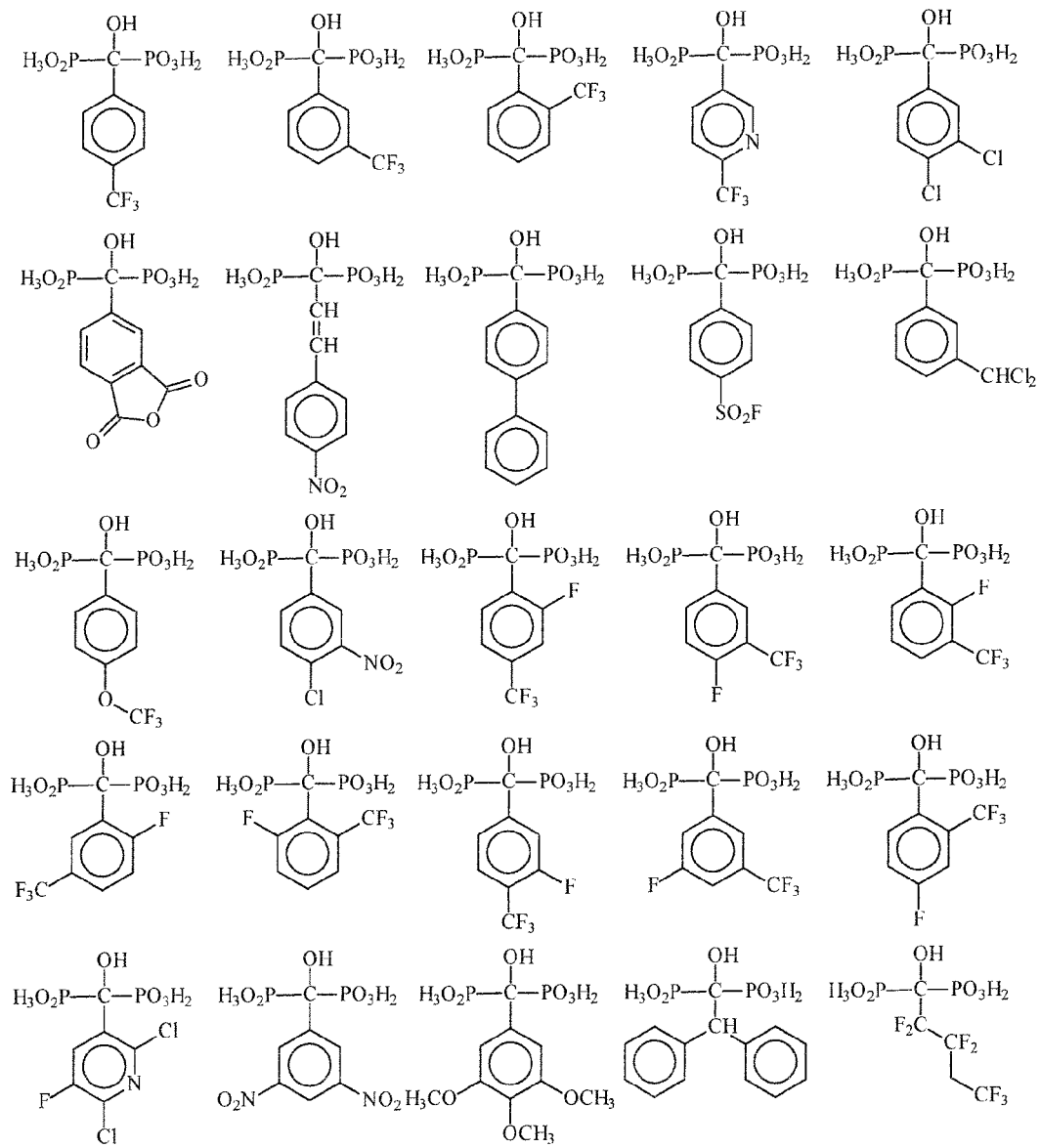
Figure 6: 1-Hydroxymethylenebisphosphonic acids prepared via reaction of carboxylic acid chlorides with tris(trimethylsilylphosphite) (continued)

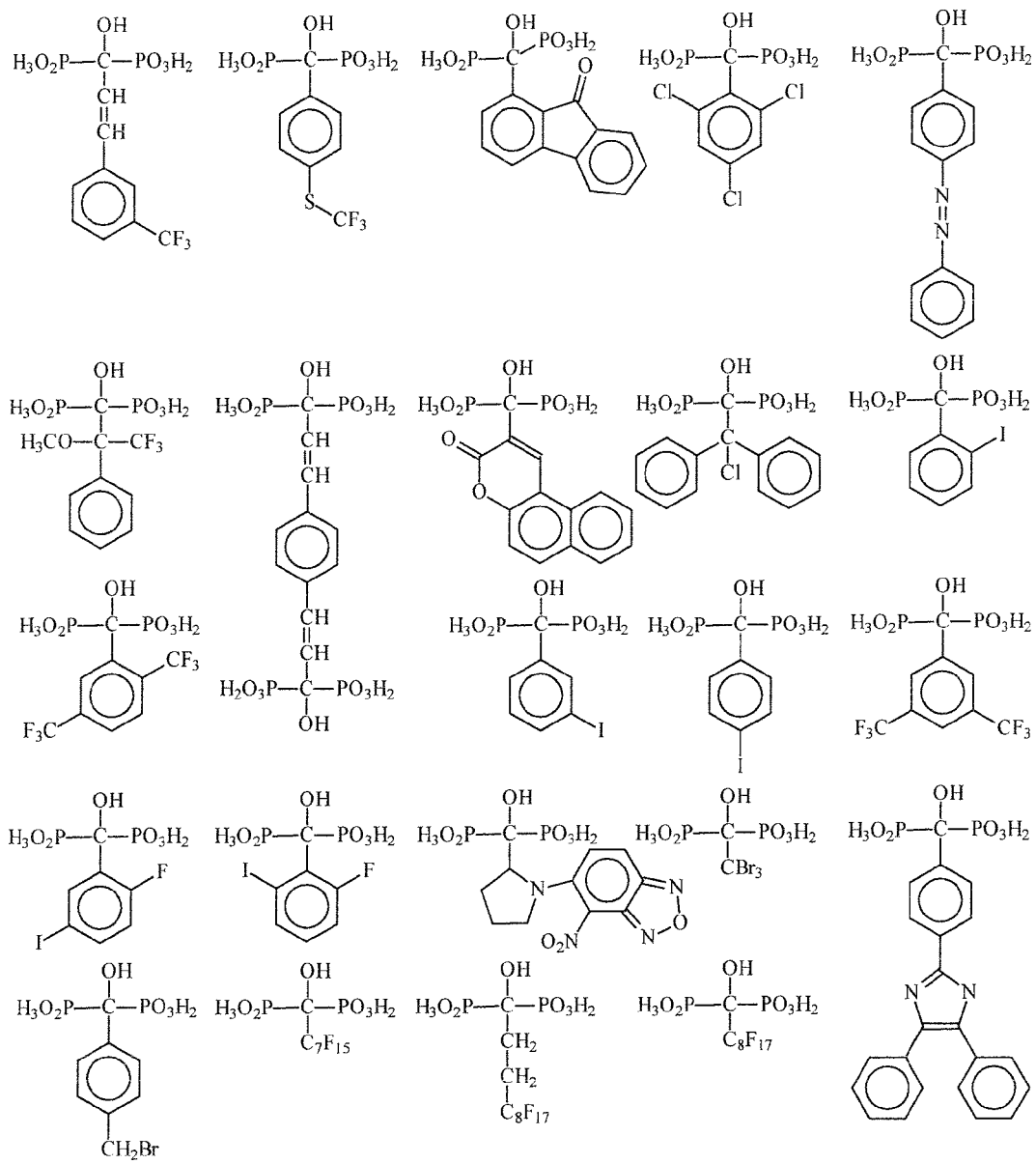
Figure 7: 1-Hydroxymethylenebisphosphonic acids prepared via reaction of carboxylic acid chlorides with tris(trimethylsilylphosphite) (continued)

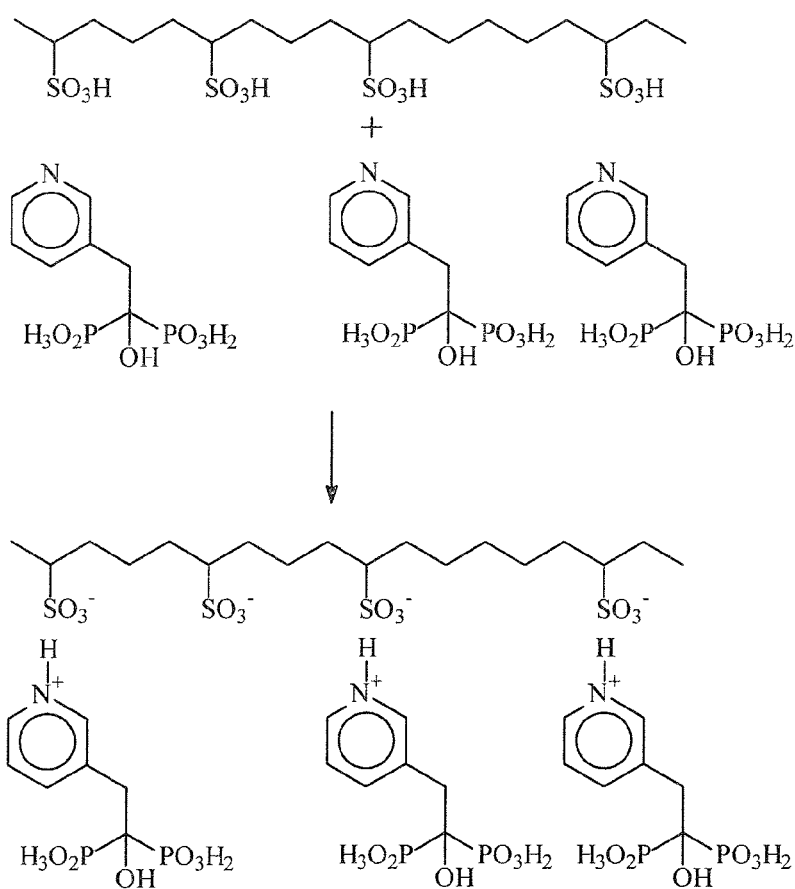
Figure 8: Ionical Cross-linking between low-molecular hydroxymethylenebisphosphonic acid and the sulfonic acid groups of an ionomer

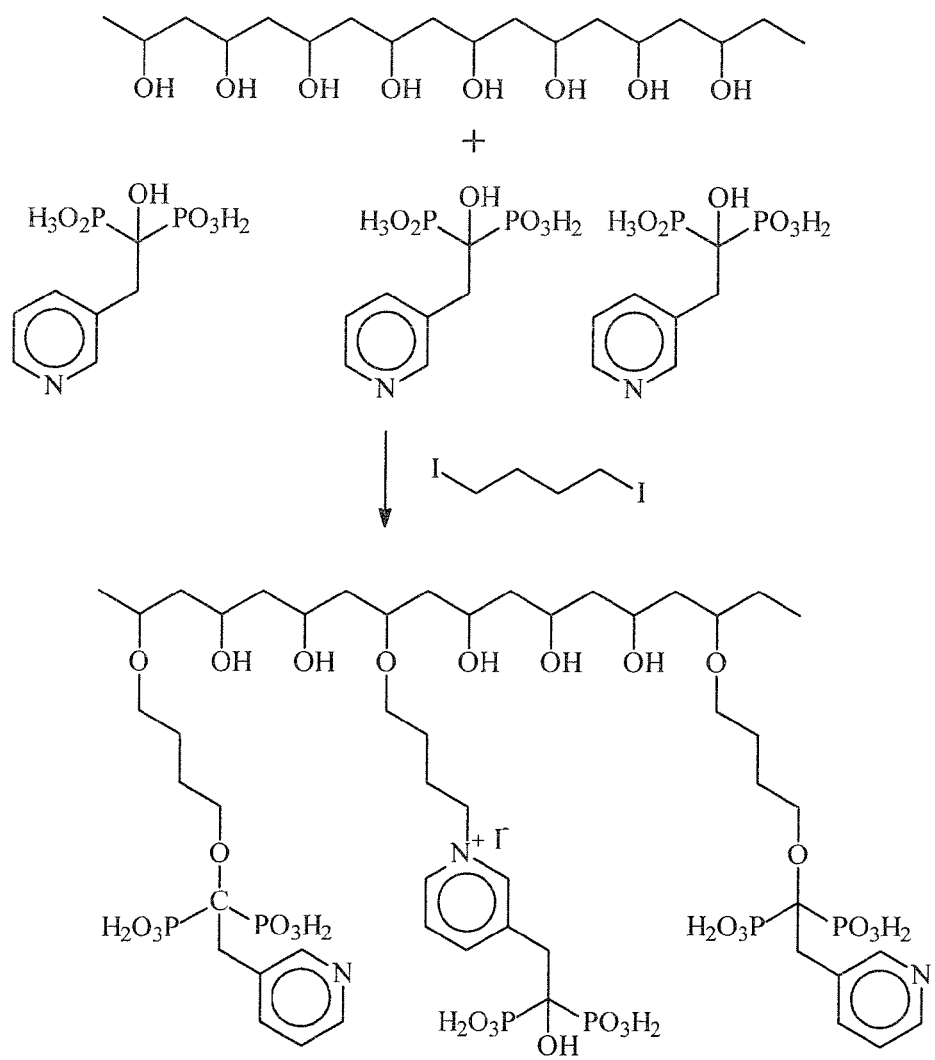
Figure 9: Covalent cross-linking between hydroxymethylenebisphosphonic acids and the OH groups of a polymer

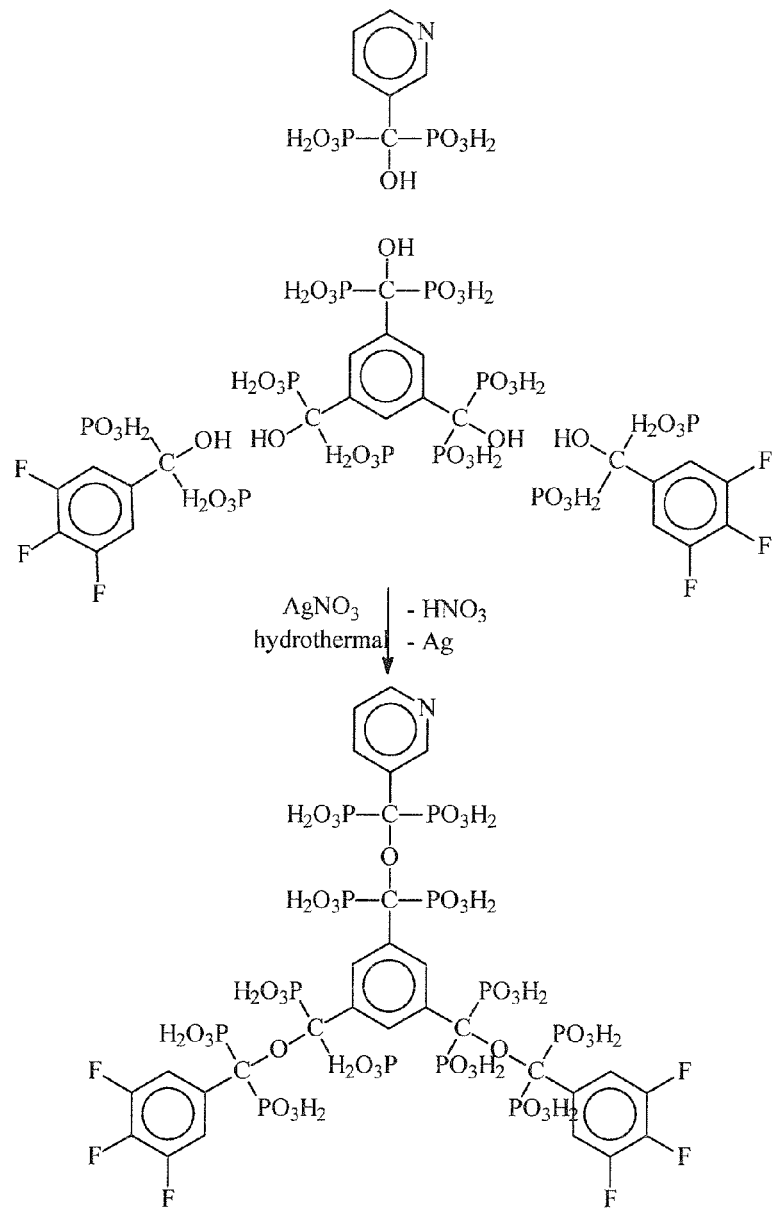
Figure 10: Cross-linking of the OH groups of a 1-hydroxymethylene-1,1-bisphosphonic acid under network formation

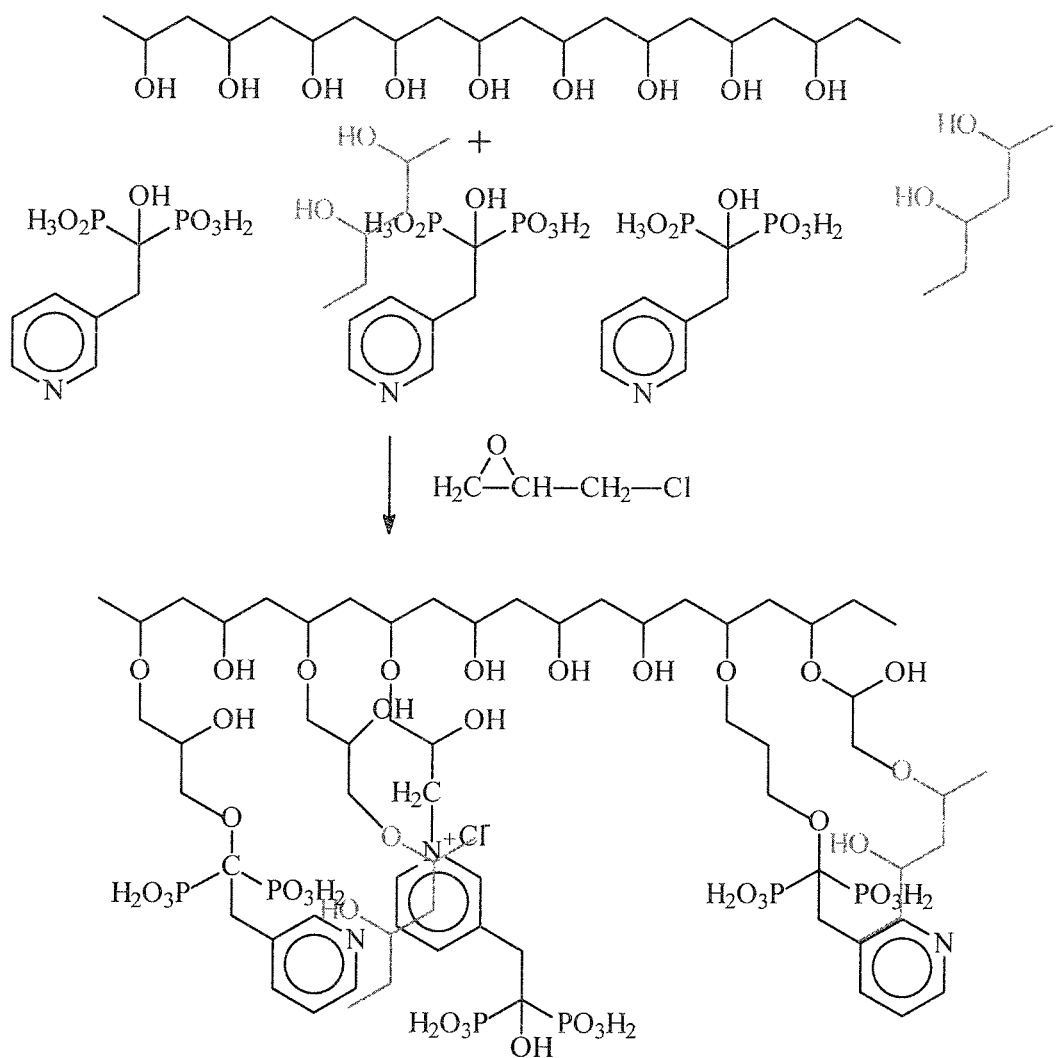
Figure 11: Cross-linking of the OH groups of 1-hydroxymethylene-1,1-bisphosphonic acid molecules with OH groups of a polymer via use of epichlorohydrin as cross-linker

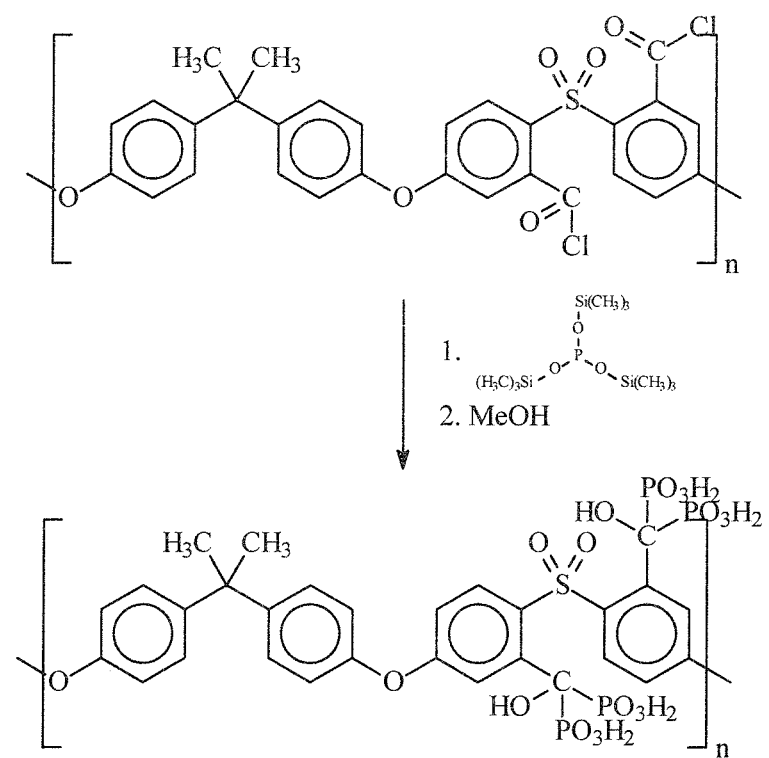
Figure 12: Preparation of PSU modified with 1-hydroxymethylene-1,1-bisphosphonic acid groups from PSU-carboxylic acid chloride

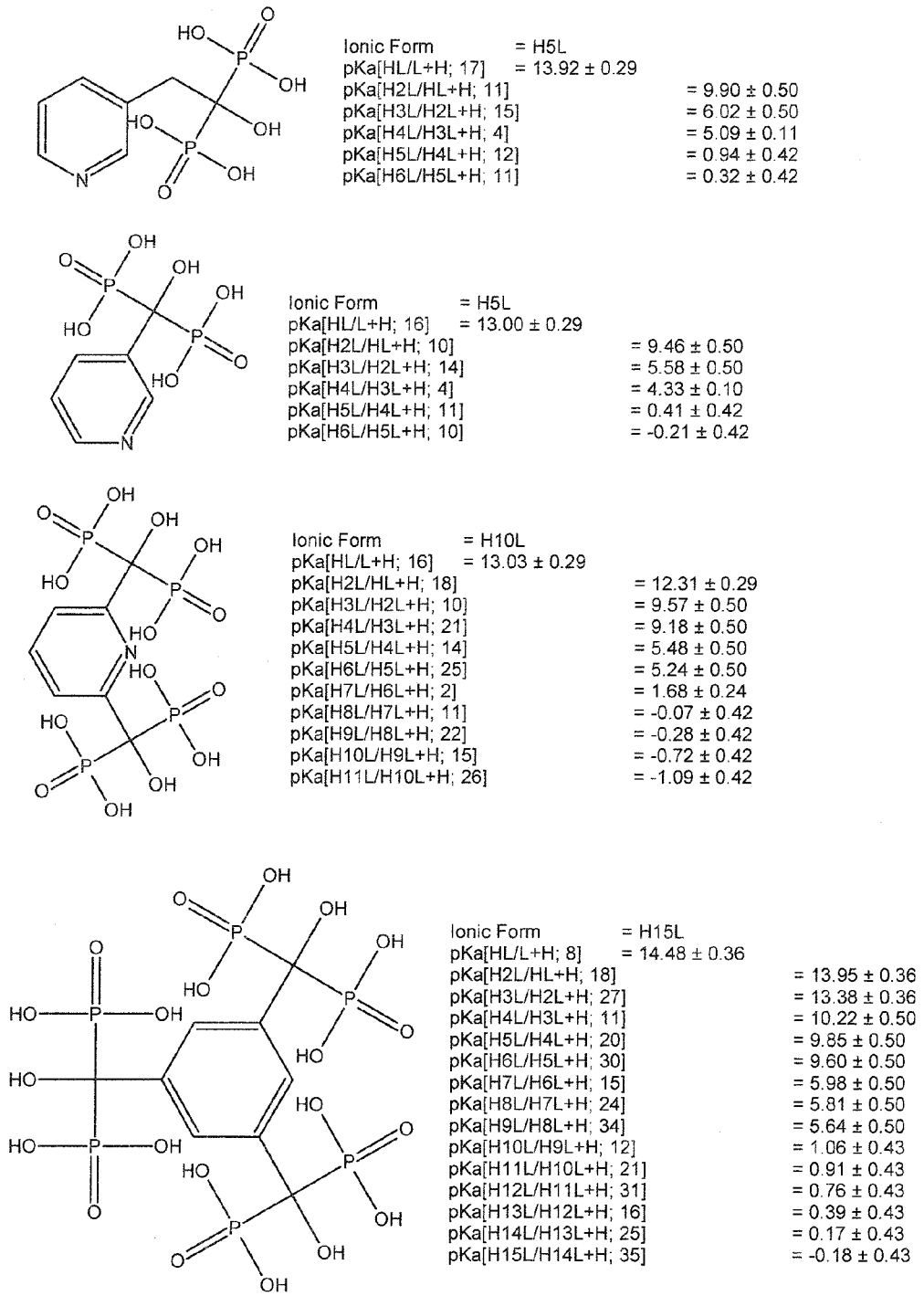
Figure 13: pK$^a$ values of low-molecular 1-hydroxymethylene-1,1-bisphosphonic acids according to invention

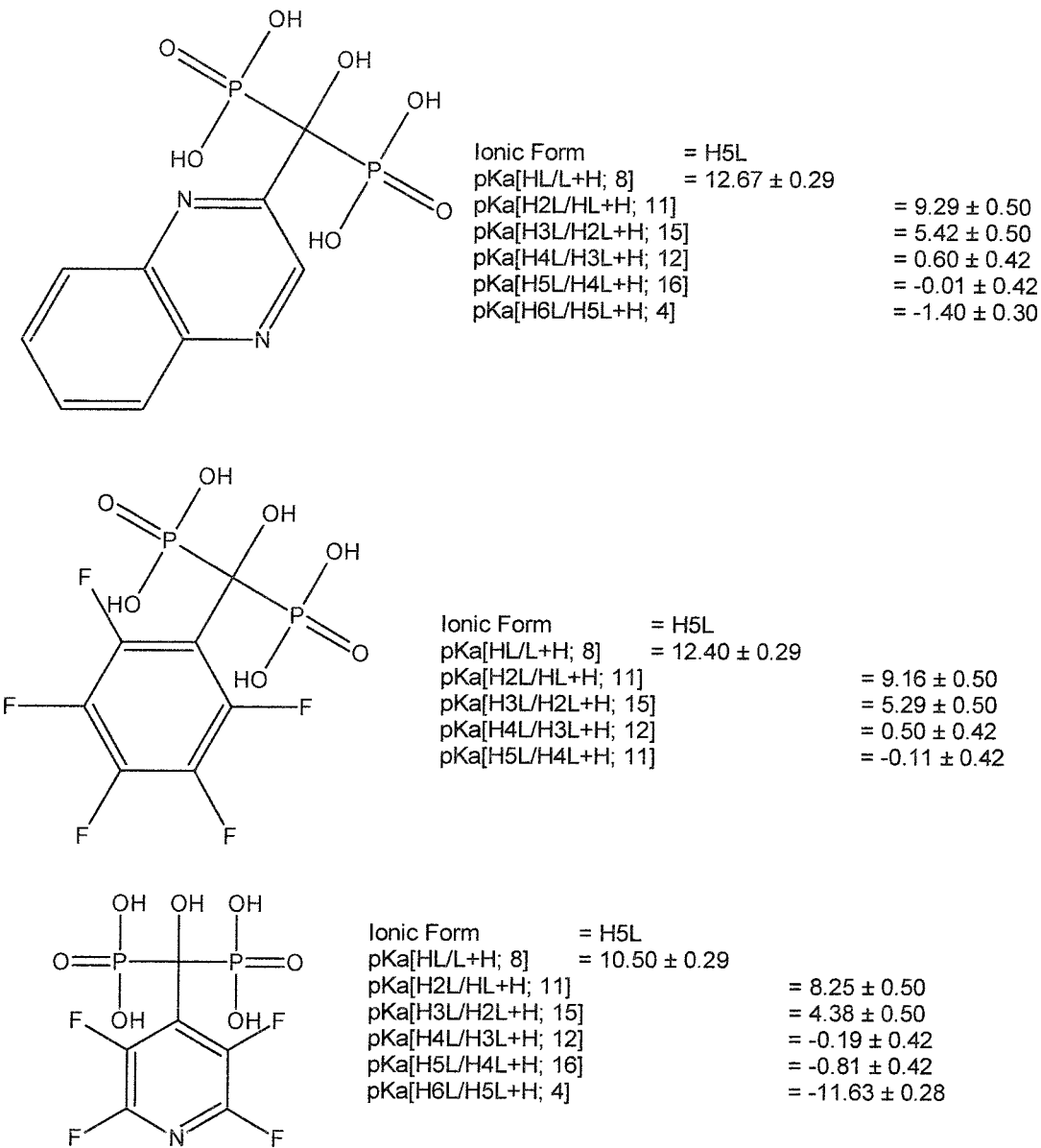
Figure 14: pK_A values of low-molecular 1-hydroxymethylene-1,1-bisphosphonic acids according to invention (continued)

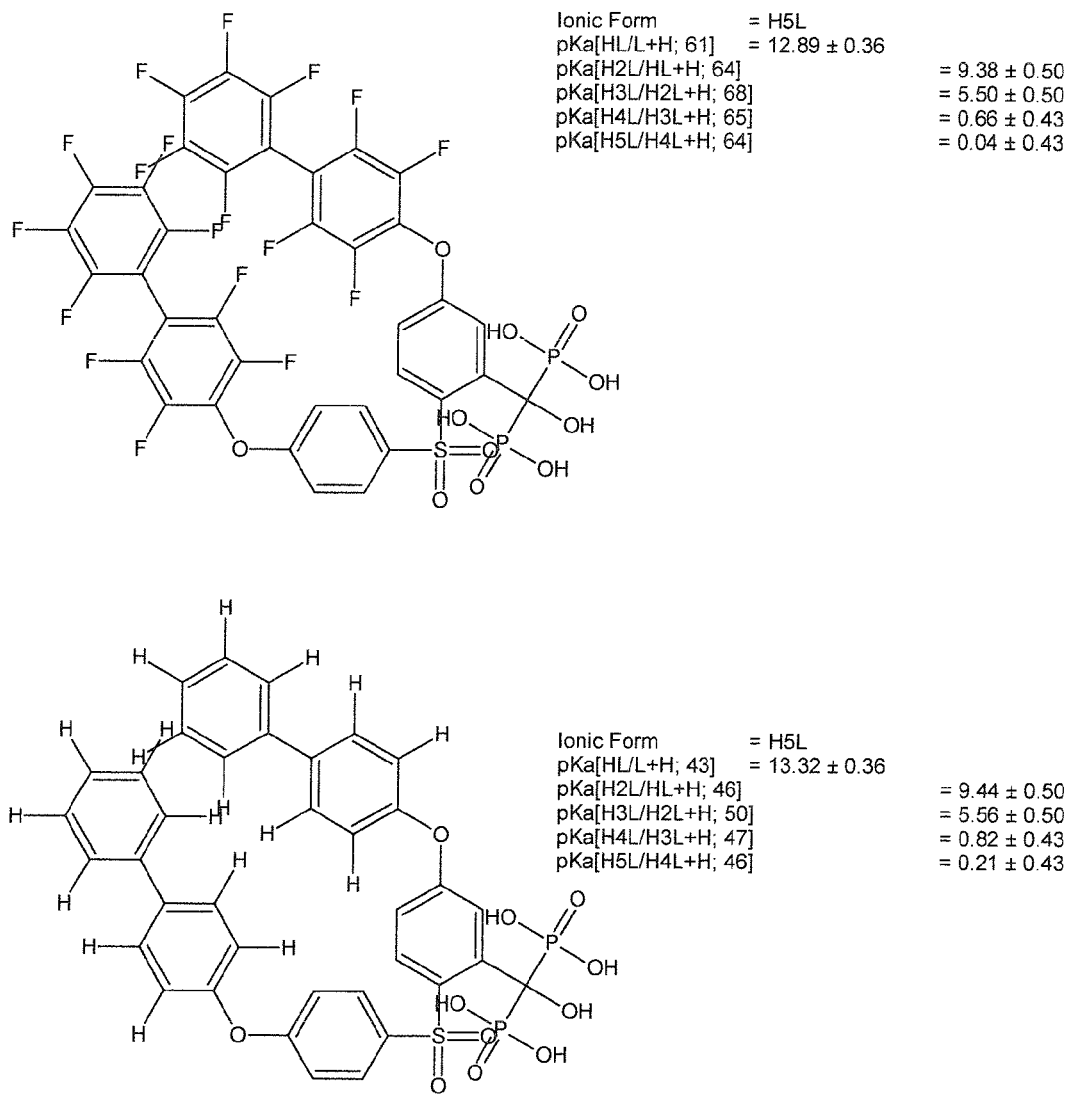
Figure 15: pK_A of the model compounds of two high-molecular 1-hydroxymethylene-1,1-bisphosphonic acids, according to invention

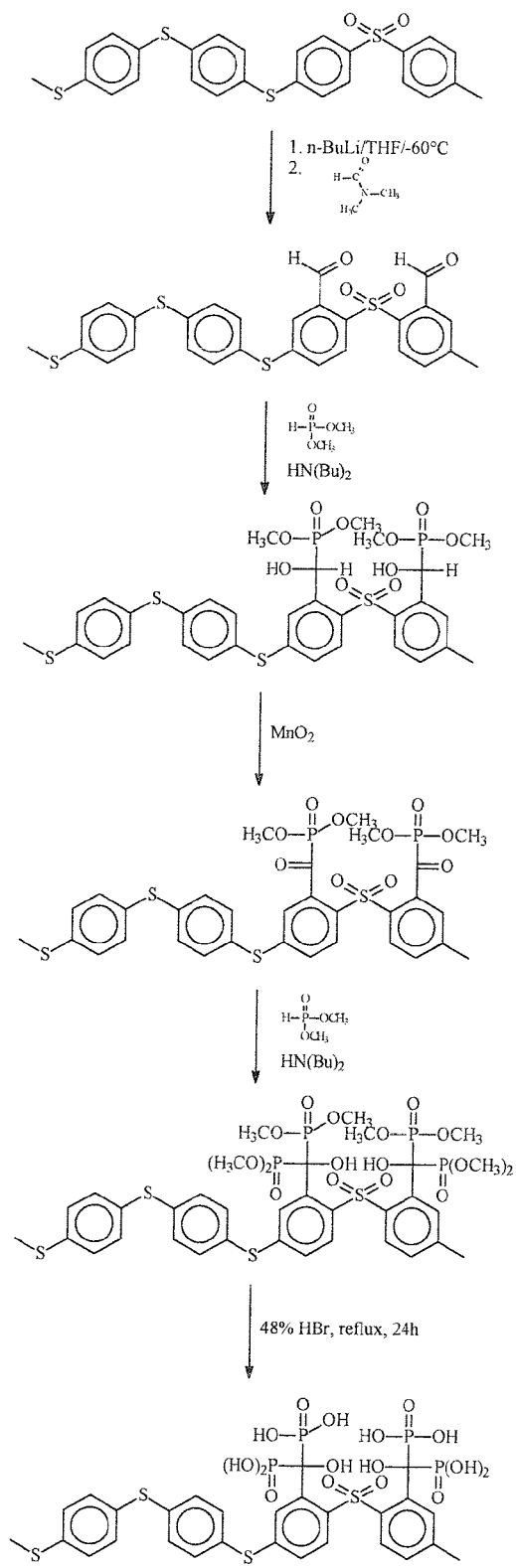
Figure 16: Preparation of a polythioethersulfone containing 1-hydroxymethylene-1,1-bisphosphonic acid groups via lithiation

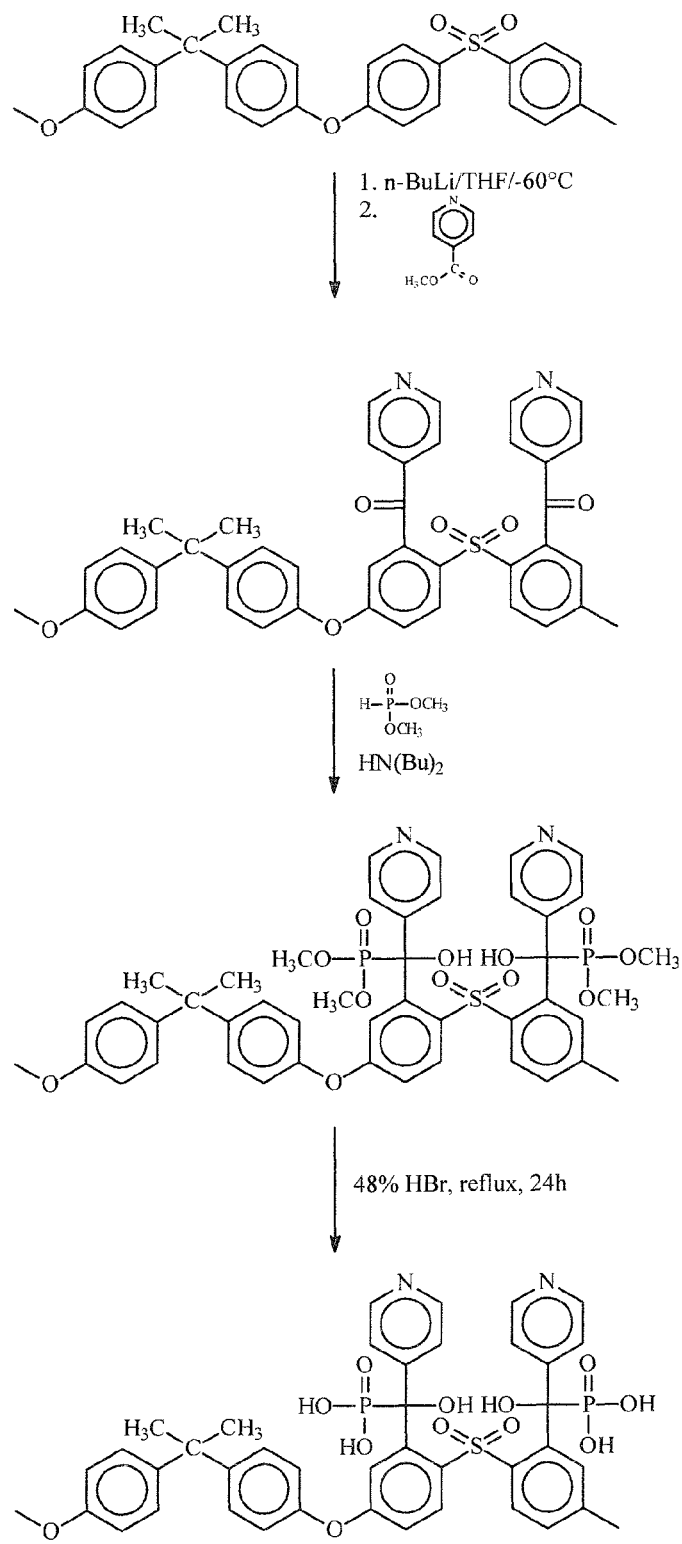
Figure 17: Preparation of a polyethersulfone containing 1-hydroxymethylene-1,1-bisphosphonic acid groups via lithiation Ar₁:
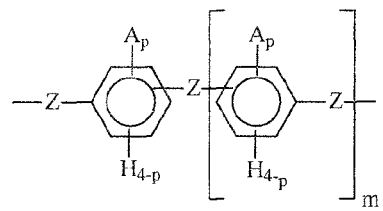
with
$A_p = -H, -Cl, -Br, -F, -CF_3, -CH_3, -CH_2CH=CH_2, -C_6H_5, -C_6F_5$
p = 0, 1 or 2
Z = direct bond, $-C(CH_3)_2-, -C(CF_3)_2-, -O-, -S-, -S(O)-, S(O)_2-,$
$-C(O)-, -P(C_6H_5)-, -P(O)(C_6H_5)-, -P(O)(C_6F_5), -C(CH_3)(C_6H_5)-, -C(C_6H_5)_2-,$
$-(CF_2)_{1-6}-, -C(CF_3)(C_6F_5)-, -C(C_6F_5)_2-,$
m = 1 or 2
Ar₂:
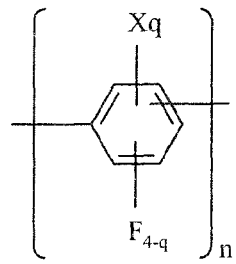
with
$X_q = -H, -Cl, -Br, -F, -CF_3, -CH_3, -CH_2CH=CH_2, -C_6H_5, -C_6F_5,$
q = 1, 2 or 3, n = 1 or 2
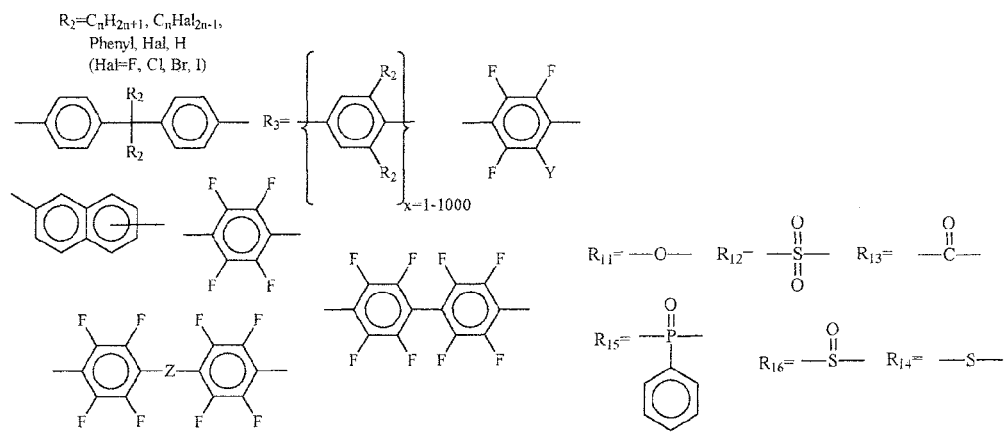
Figure 18: Possible structures of the polymer backbone and preferred polymer structures

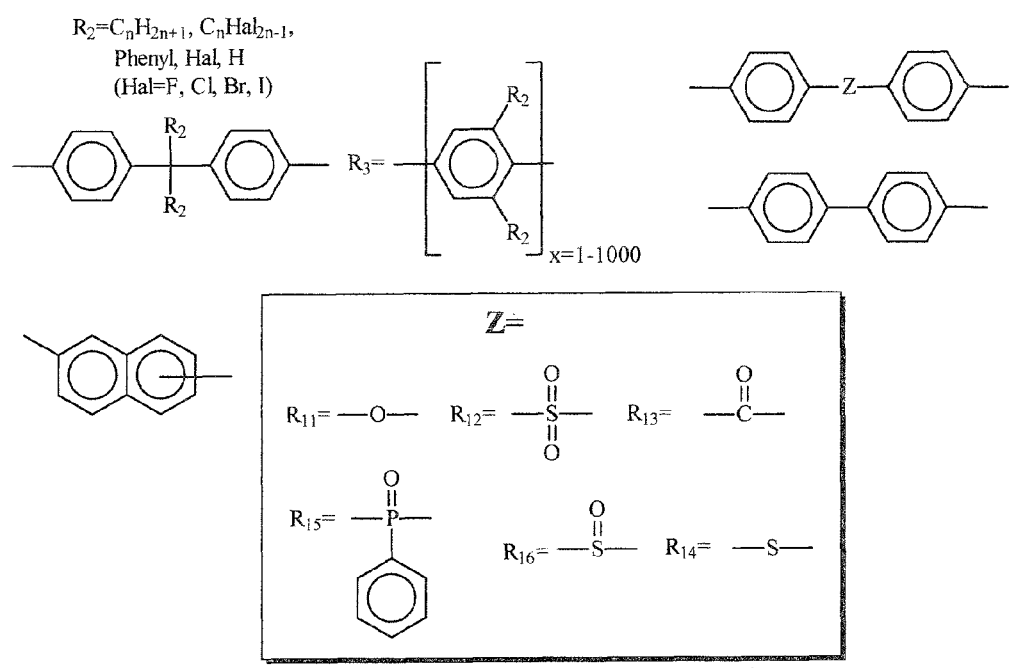
Figure 19: Possible structures of the polymer backbone and preferred polymer structures (continued)

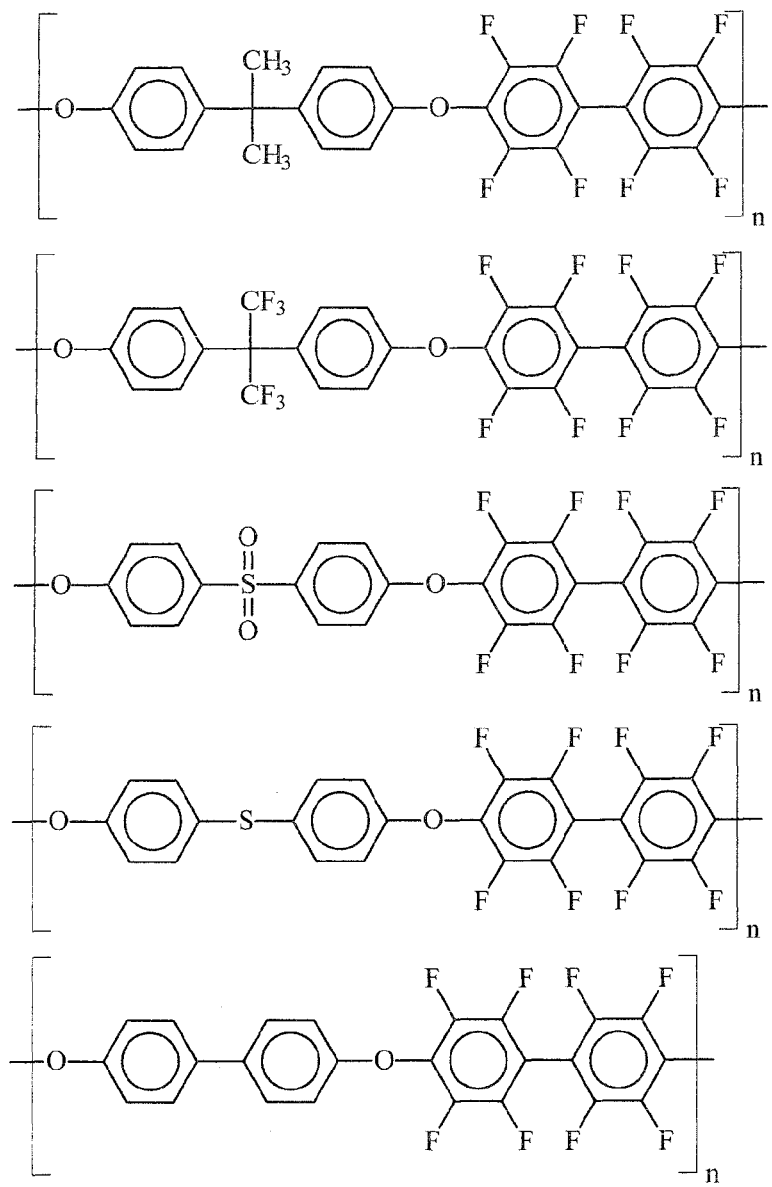
Figure 20: Possible structures of the polymer backbone and preferred polymer structures (continued)

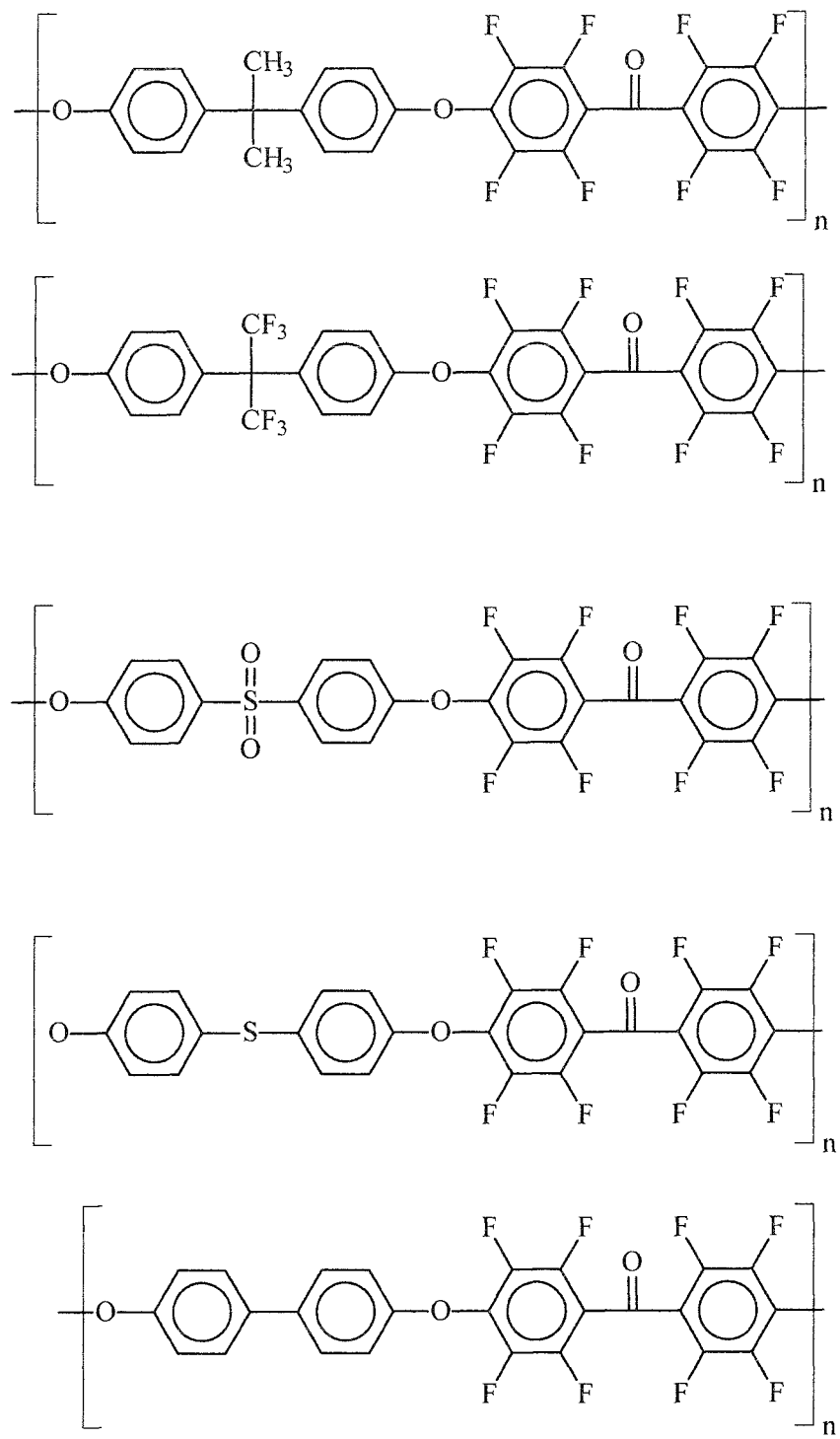
Figure 21: Possible structures of the polymer backbone and preferred polymer structures (continued)

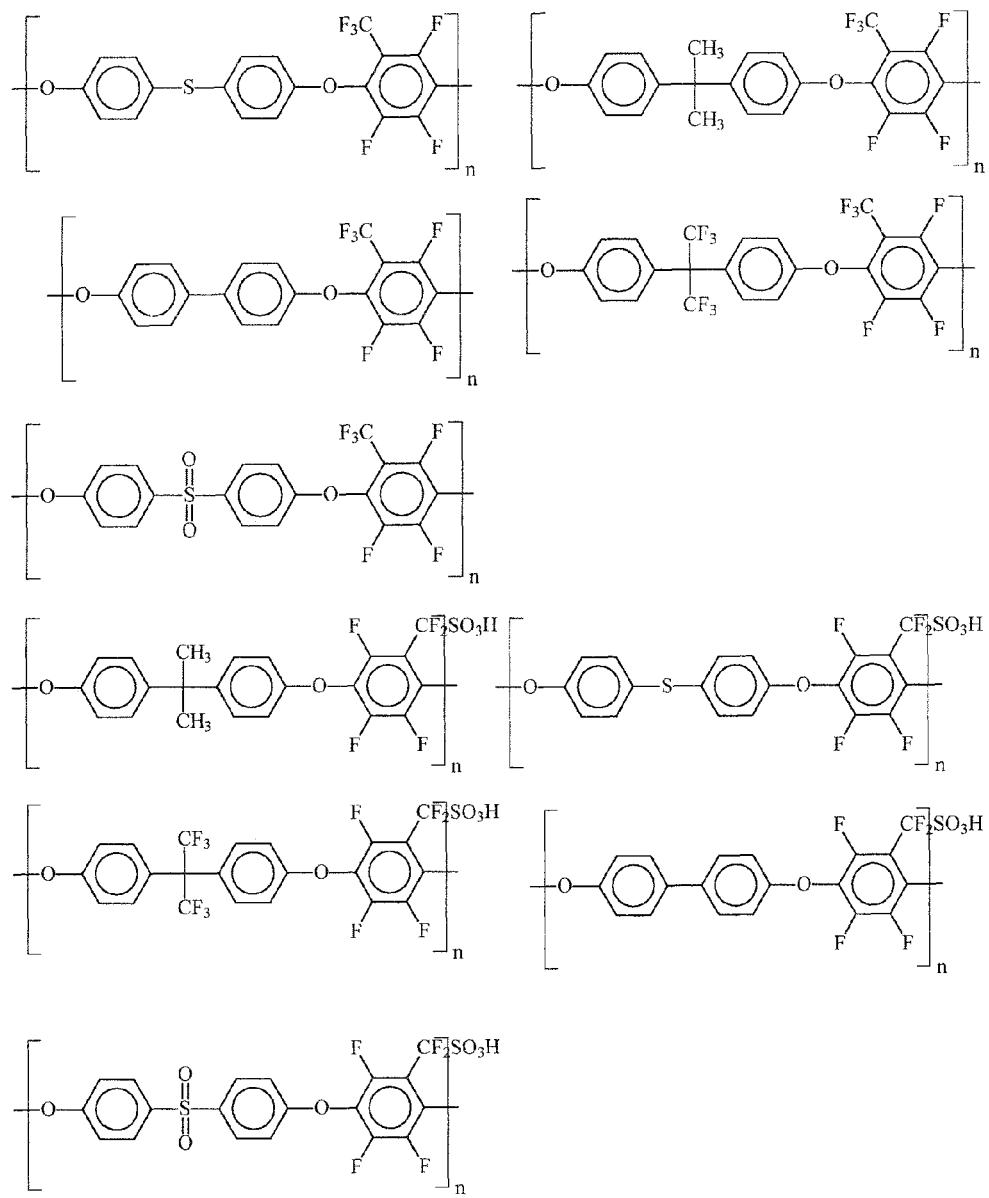
Figure 22: Possible structures of the polymer backbone and preferred polymer structures (continued)

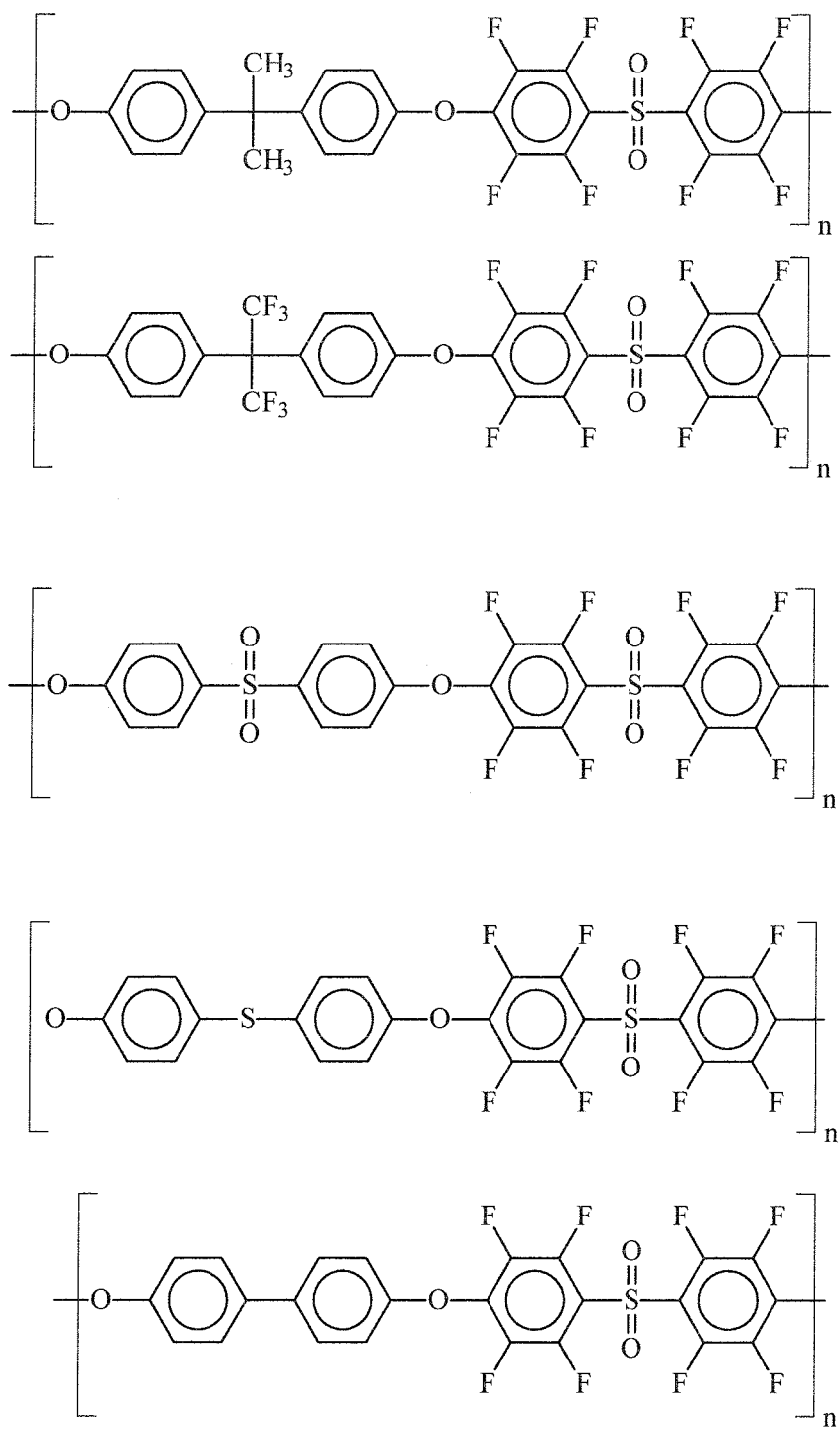
Figure 23: Possible structures of the polymer backbone and preferred polymer structures (continued)

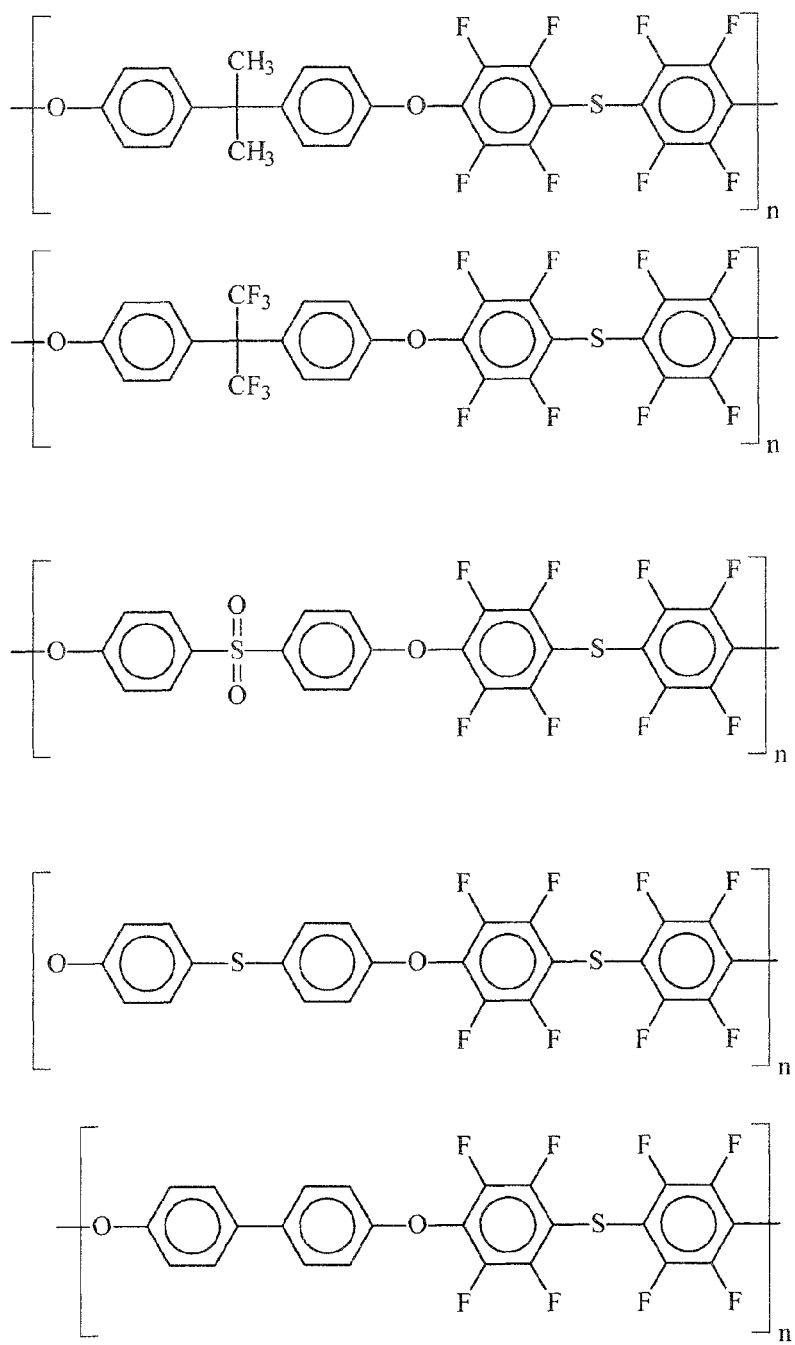
Figure 24: Possible structures of the polymer backbone and preferred polymer structures (continued)

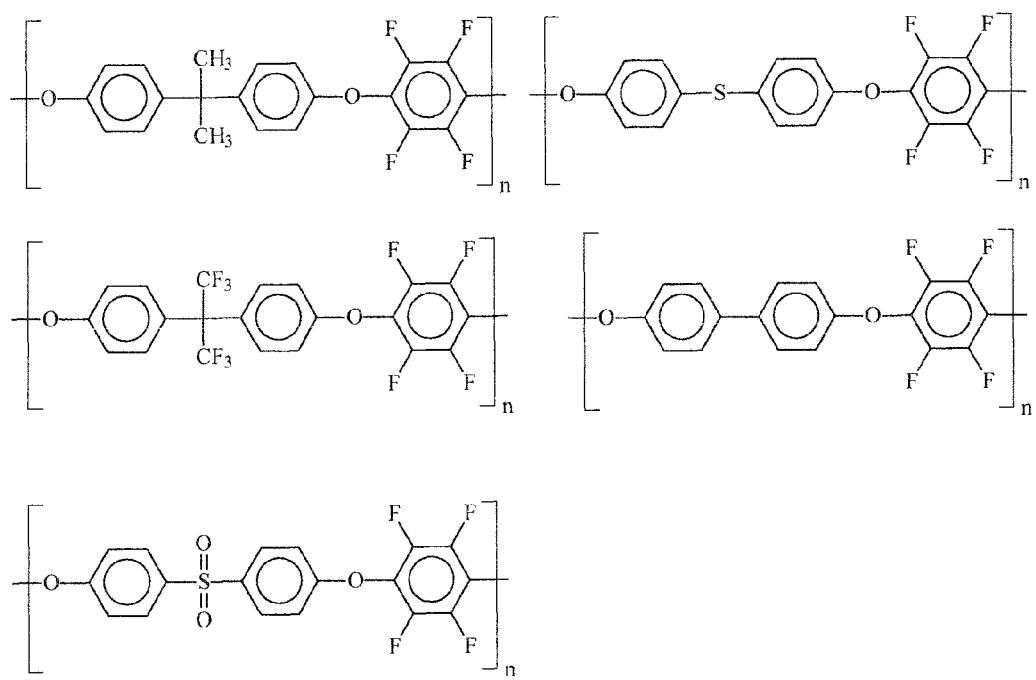
Figure 25: Possible structures of the polymer backbone and preferred polymer structures (continued)

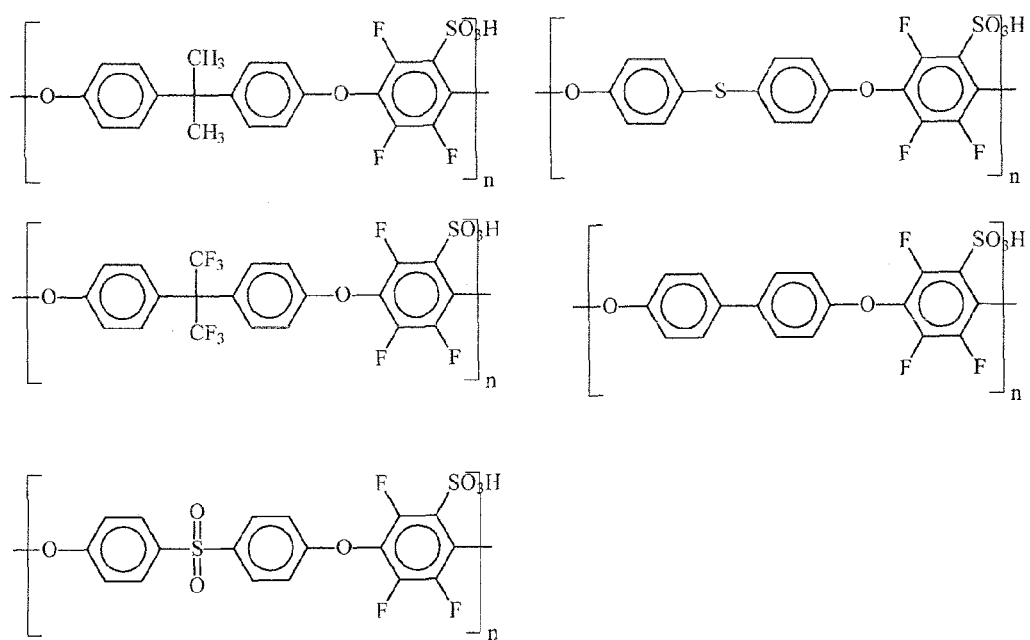
Figure 26: Possible structures of the polymer backbone and preferred polymer structures (continued)

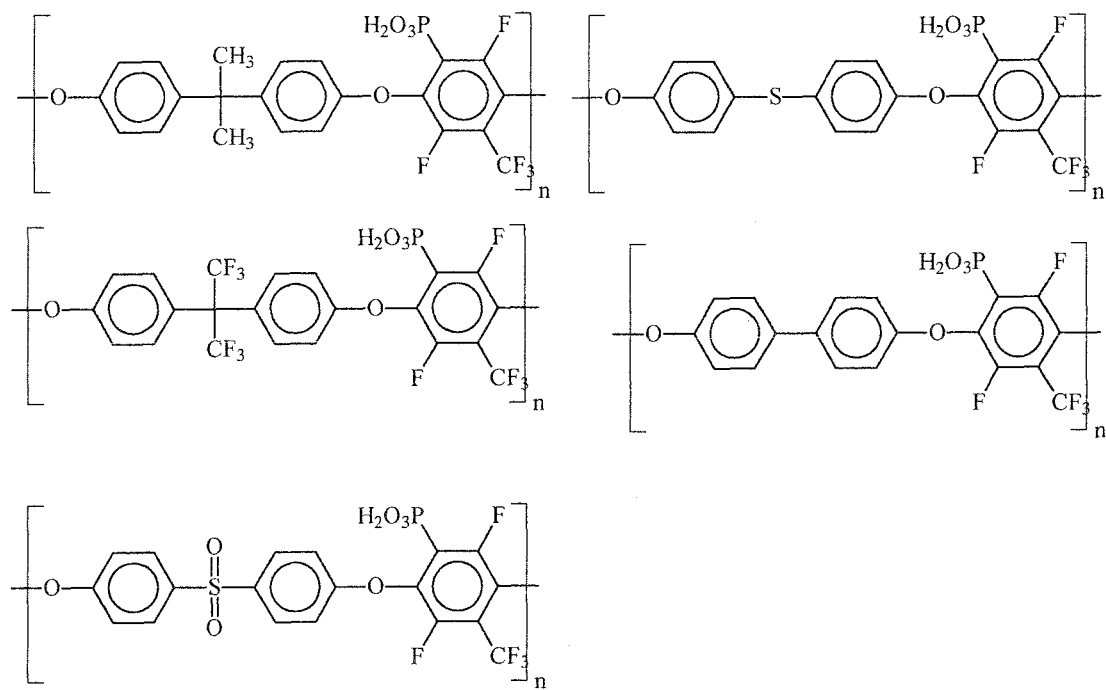
Figure 27: Possible structures of the polymer backbone and preferred polymer structures (continued)

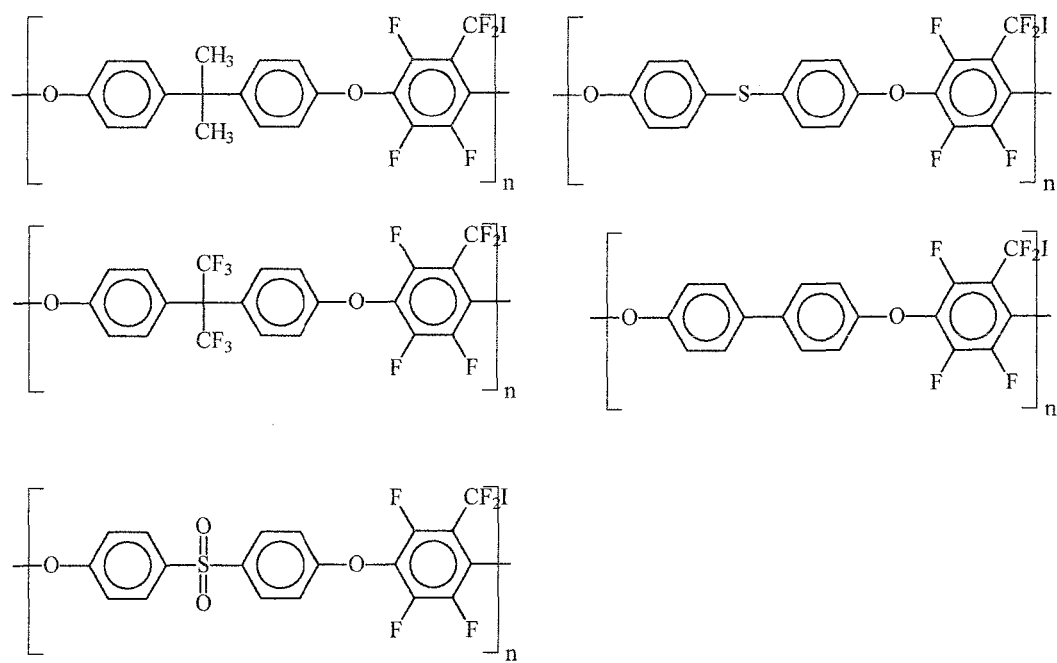
Figure 28: Possible structures of the polymer backbone and preferred polymer structures (continued)

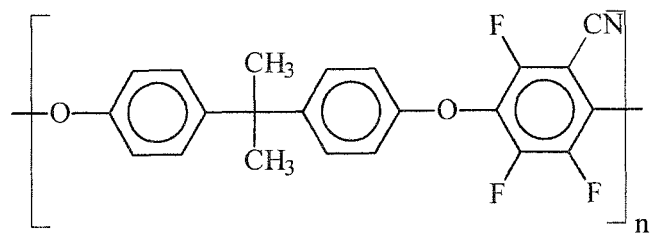
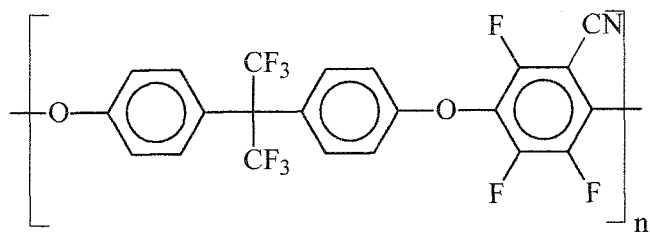
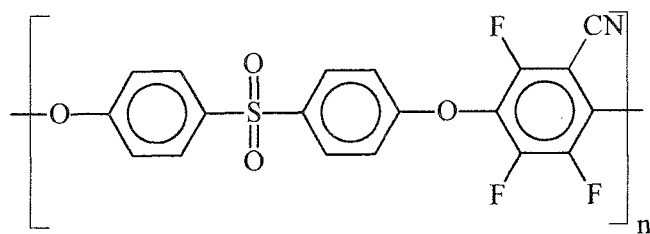
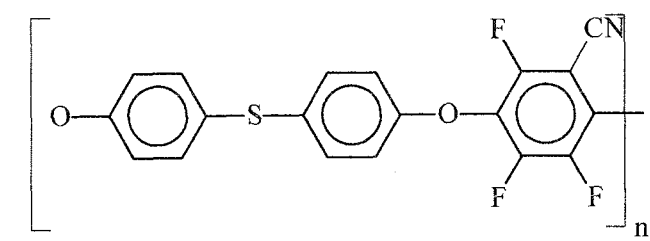
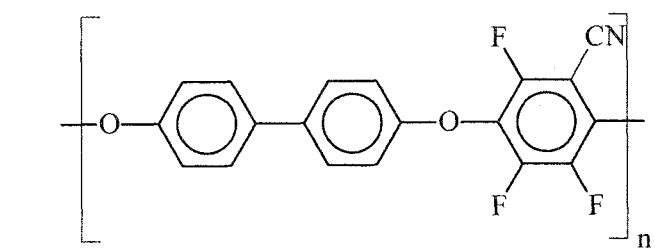
Figure 29: Possible structures of the polymer backbone and preferred polymer structures (continued)

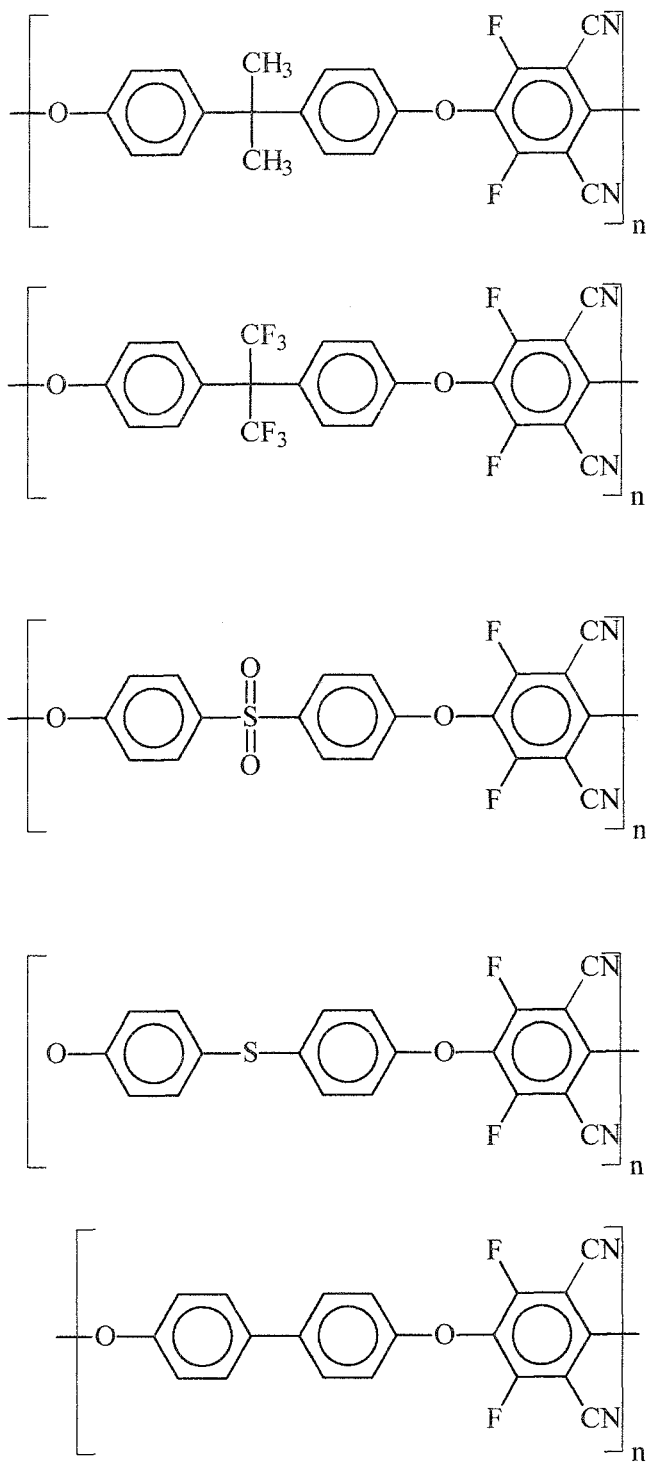
Figure 30: Possible structures of the polymer backbone and preferred polymer structures (continued)

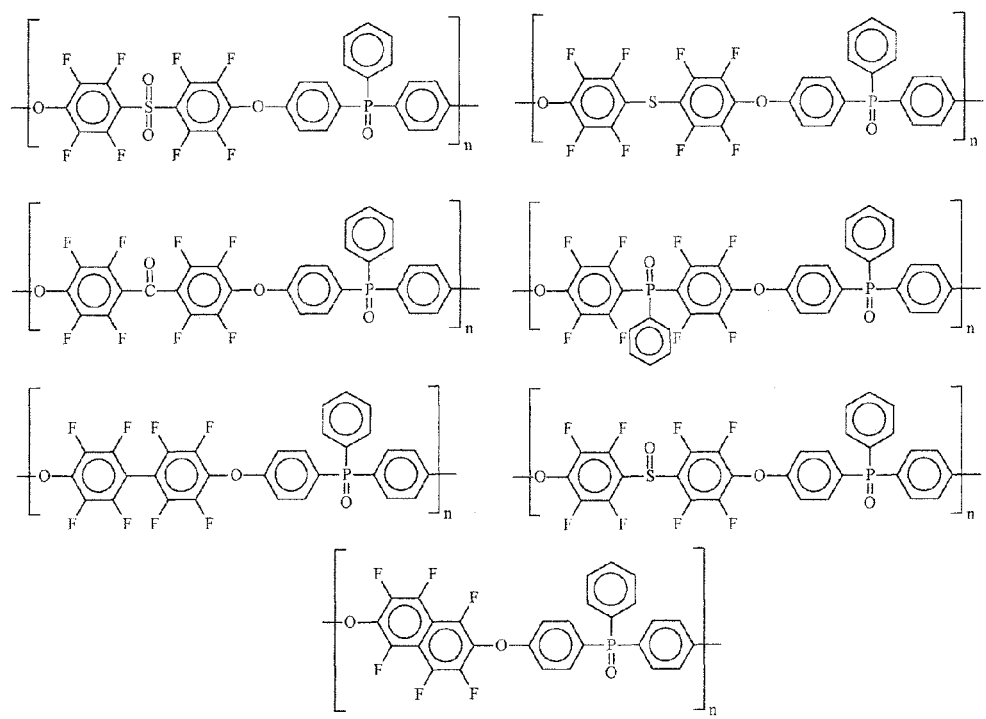
Figure 31: Possible structures of the polymer backbone and preferred polymer structures (continued)

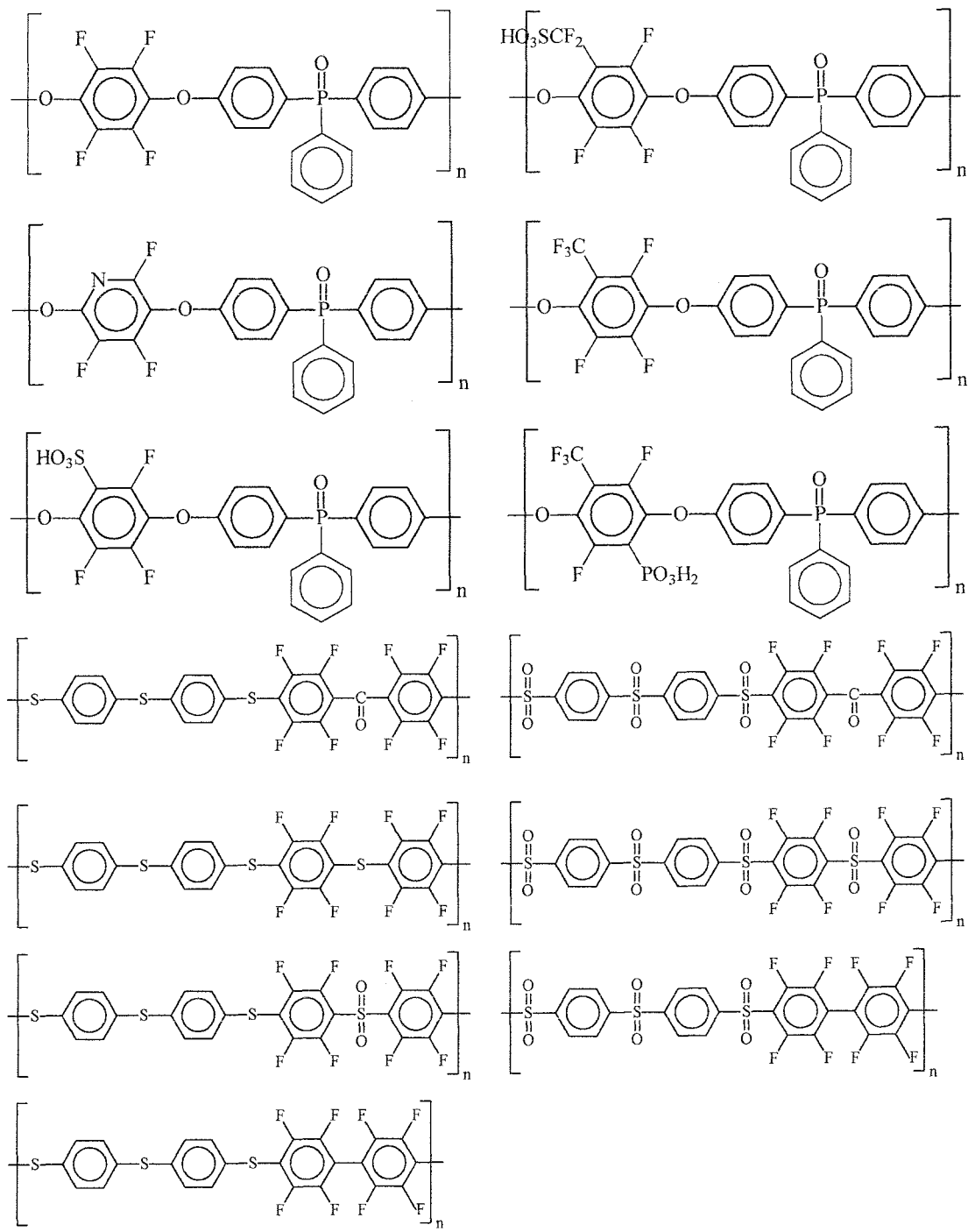
Figure 32: Possible structures of the polymer backbone and preferred polymer structures (continued)

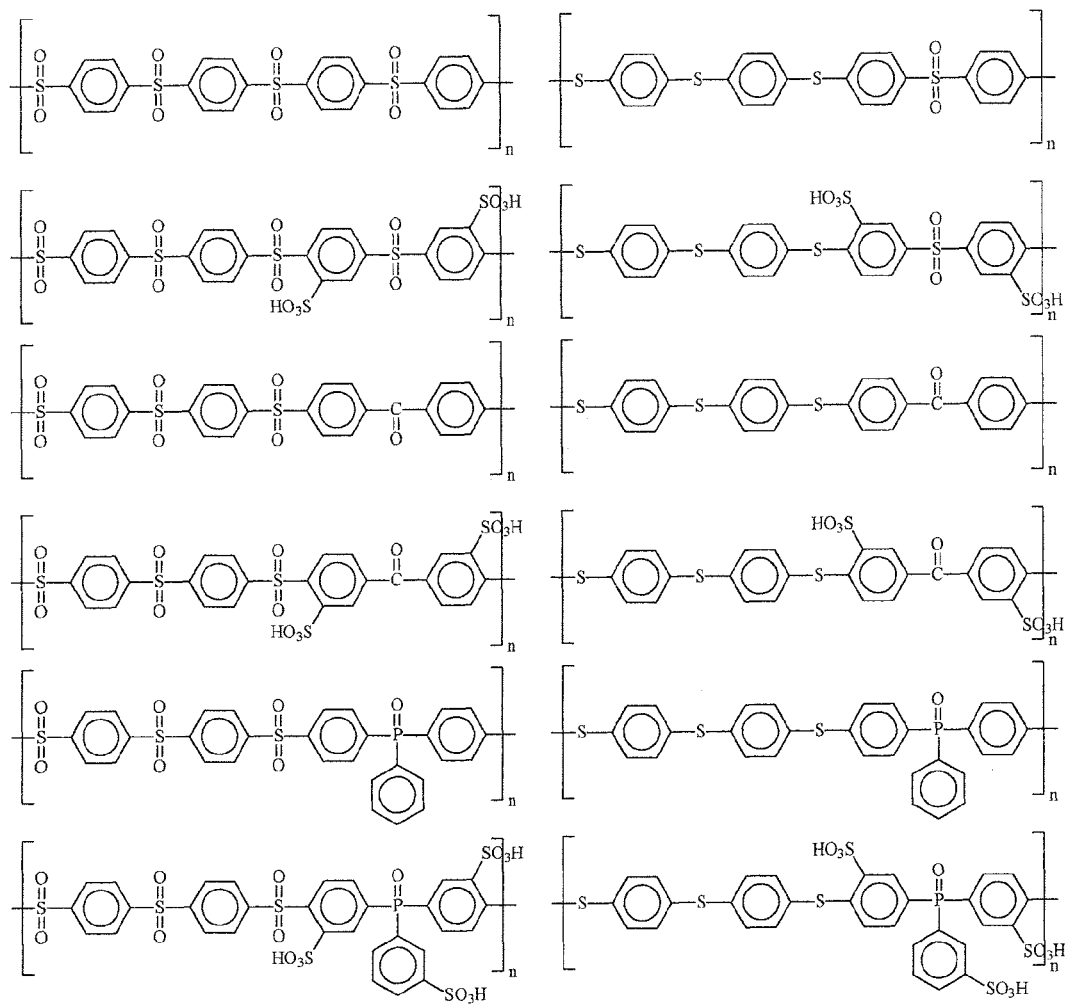
Figure 33: Possible structures of the polymer backbone and preferred polymer structures (continued)

PHOSPHONIC ACID-CONTAINING BLENDS AND PHOSPHONIC ACID-CONTAINING POLYMERS

STATE-OF-THE-ART

Commercially available ionomer membranes based on perfluorinated sulfonic acids can be used at temperatures below 100° C. in electrochemical cells, especially in fuel cells and show in this temperature range good $H^+$-conductivities and high (electro)chemical stability. They can't be used at temperatures above 100° C., because they dry out and fort his reason their proton conductivity decreases several orders of magnitude[1, 2]. However it makes sense to run a fuel cell at temperatures above 100° C. because the CO-tolerance of the fuel cell reaction in this temperature range is markedly greater due to a faster electrode kinetic as below 100° C.[3]. However as explained above is the use of sulfonated ionomer membranes at temperatures above 100° C. in fuel cells atmospheric pressure and with out humidifying of the membrane not possible. In the literature several approaches for alternative proton conductors in the temperature range of approximately 100 to 200° C. can be found. One of these approaches is the incorporation of matter in the sulfonated fuel cell membrane, which is able to store water above 100° C. in the fuel cell membrane and to secure thereby a sufficient proton conductivity of sulfonated fuel cell membranes in this temperature range. Such matter comprises microporous particles in micrometer to nanometer size composed out of inorganic hydroxides, oxides or salts or out of inorganic/organic hybrid compounds, such as $SiO_2$[4, 5, 6], $TiO_2$, $ZrO_2$[7], or from layered phosphates or from zirconium sulfophenylphosphonates, whereby the layered phosphates like zirconiumhydrogenphosphate or zirconiumsulfophenylphosphonate show also a self proton conductivity[8, 9]. Another approach is the incorporation of phosphoric acid in basic polybenzimidazole-membranes, whereby the phosphoric acid works as proton conductor, because phosphoric acid can be a proton donor as well as a proton acceptor. These membranes can be used in fuel cells up to 200° C.[10, 11, 12, 13].

As the phosphoric acid can bleed out from these membranes below 100° C. (due to formation of liquid product water), membranes have been developed with the by itself proton-conducting phosphonic acid group. From the literature are also known several publications to make phosphonated ionomer membranes. They comprise perfluorinated phosphonated membranes[14], phenylphosphonic acid-modified polyaryloxyphosphazenes[15] or membranes based on aryl main chain polymers like Polysulfone Udel[16,17] or polyphenylene oxide[18]. Research on phosphonic acid groups containing model compounds showed significant self proton conductivity also at reduced humidification[19].

Polymers modified with phosphonic acid groups show however the following disadvantages which have hindered so far their use in fuel cells:

so far experimentally only low phosphonation degree could be obtained (about one phosphonic acid group per polymer-repeating unit)[15,20,21,17]
there are no (water-free) conductivity data of phosphonated polymers published (only conductivity data of phosphonated oligomers are documented[19])
non-fluorinated arylphosphonic acids are in general only medium strong acids ($pK_S \approx 2$)
only low proton conductivities are obtained with the so far synthesised phosphonated ionomers
phosphonic acids could so far only introduced as ester in polymers (Michaelis-Arbusov[17] or Michaelis-Becker reaction[18] or via lithiation[20,16])
hydrolysis of the ester of phosphonic acids to the free phosphonic acid has been reached so far only partially[20]
problematic solubility of polymeric phosphonic acids (sparingly soluble in the "classic" solvents for ionomers like NMP, DMAc or DMF)
polymeric phosphonic acids show bad film building properties (are very brittle)
many phosphonation processes can not be transferred from low molecular compounds to high molecular compounds, in part due to solubility problems in the solvents used for these reactions
in part polymer decomposition during the phosphonation reaction or during the hydrolysis of the ester of the phosphonic acid to the free phosphonic acid (in one experiment polymer decomposition from 20.000 g/mol to 2.000 g/mol has been observed)[22]
phosphonic acids tend at temperatures around 120° C. to condensate, which renders their use in fuel cells in the temperature range above >100° C. so far impossible.

OBJECTIVE

The objective of the present invention consists in the synthesis of mixtures of polymers containing 1-hydroxymethylene-1,1-bisphosphonic acid groups with the following properties:

highest possible acidity of the phosphonic acid groups
highest possible content of phosphonic acid groups
suppression of the condensation of the phosphonic acid group
highest possible proton conductivity also at reduced humidification and at temperatures up to 180° C.
prevention of bleeding out of the polymer blends, if blends of polymeres with low molecular 1-hydroxymethylene-1,1-bisphosphonic acids according to the invention are used in membrane applications.

A further objective of this invention are processes to produce mixtures of polymers (blends) containing phosphonic acid groups.

Finally an objective of this invention is to apply the mixtures of polymers (blends) in membrane processes like gas separation, pervaporation, perstraction, PEM-electrolysis and secondary batteries like PEM- as well as direct methanol fuel cells especially at conditions of reduced humidification (0 to 50%) and higher temperature (temperatures of 60 to 180° C., especially temperatures of 80 to 180° C., and in particular temperatures of 100 to 130° C.).

BRIEF DESCRIPTION OF THE DRAWINGS

FIG. 1 shows preferred 1-hydroxymethylene-1,1-hiphosphonic acids, to be prepared from their respective carboxylic acid and subsequent hydrolysis, according to one embodiment of the present invention.

FIG. 2 shows a preparation procedure of 1-hydroxymethylene-hiphosphonic acids from carboxylic acid chlorides, according to one embodiment of the present invention.

FIGS. 3-7 each show specific examples of the 1-hydroxymethylene-hiphosphonic acids prepared from the reaction illustrated in FIG. 2.

FIG. 8 shows ionic cross-linking between low molecular weight hydroxymethylene-hiphosphonic acids and the sulfonic acid groups of an ionomer.

FIG. 9 shows covalent cross-linking between low molecular weight hydroxymethylene-hiphosphonic acids and the OH groups of a polymer.

FIG. 10 shows cross-linking of the OH groups of a 1-hydroxymethylene-1,1-biphosphonic acid under network formation.

FIG. 11 shows cross-linking of the OH groups of 1-hydroxymethylene-1,1-biphosphonic acid molecules with OH groups of a polymer via a polymer.

FIG. 12 shows a preparation procedure of PSU modified with 1-hydroxymethylene-1,1-biphosphonic acid groups from PSU carboxylic acid chloride, according to one embodiment of the present invention.

FIGS. 13-15 each show some examples of $pK_a$ values of low molecular weight 1-hydroxymethylene-1,1-biphosphonic acids prepared according to one embodiment of the present invention.

FIGS. 16-17 each show a preparation procedure of polythioethersulfone containing 1-hydroxymethylene-1,1-biphosphonic acid groups via lithiation, in accordance with one embodiment of the present invention.

FIGS. 18-33 each show possible structures of the polymer backbone and polymer structures suitable for use in the preparation procedures disclosed herein, according to various embodiments of the present invention.

DESCRIPTION

It has been found surprisingly that the objective of the invention can be obtained by:
1. Production of if Necessary Physically, Ionically or Covalently Cross-Linked Blends and Blend Membranes of Low Molecular Hydroxymethylene-Oligo-Phosphonic Acids R—$C(PO_3H_2)_x(OH)_y$, with Polymers Containing the Following Functional Groups:
   cation exchange groups or there non-ionic precursors of the type:
   $SO_2X$, X=Hal, OH, OMe, $NR_1R_2$, $OR_1$, with Me=any metal cation or ammonium cation, $R_1$, $R_2$=H or any aryl- or alkyl moiety,
   $POX_2$
   COX
   and/or
   basic groups like primary, secondary or tertiary amino groups, imidazole groups, pyridine groups, pyrazole groups etc.
   and/or
   OH groups.
   The preferred low molecular 1-hydroxymethylenephosphonic acids according to the invention, exemplarily producible from carbonic acids by reaction with $PCl_3/H_3PO_3$ and subsequent hydrolysis with $H_2O$[23,24,25,26,27] are shown in FIG. 1. Other preferred low molecular 1-hydroxymethylene-bisphosphonic acids according to the invention, producible from carbonic acids halides with tris(trimethylsilylphosphite)[28,29,30,31], production process see FIG. 2 are shown in FIG. 3, FIG. 4, FIG. 5, FIG. 6 and FIG. 7. Another process to produce 1-hydroxymethylene-1,1-bisphosphonic acids consists in the reaction of tris(trimethylphosphite) with acid anhydrides like phtalic acid anhydrid[32].

A special embodiment of these blends is that between the polymers and the low molecular phosphonic acids ionic cross-links may be formed, for instance between the cation exchange groups of the polymer with a basic group (e.g. pyridine moiety) of the low molecular phosphonic acid compound, see FIG. 8. Another possibility of bonding of the low molecular hydroxymethylenephosphonic acids on the polymers is a covalent cross-link, for instance by crosslinking of the OH-group of the phosphonic acid compound with an OH-group of the polymer via a α,ω-dihalogene alcane, see FIG. 9. Other possible cross-linking reactions for the OH-group of the 1-hydroxymethylene-1,1-bisphosphonic acid group and if necessary with OH-groups of polymers according to the invention are:

Cross-linking by addition of $AgNO_3$ to the mixture of 1-hydroxymethylene-1,1-bisphosphonic acid containing OH-groups and if necessary polymers containing OH-groups ander hydrothermal conditions and reduction of $AgNO_3$ to elemental silver nanoparticles and liberation of $HNO_3$[33] (FIG. 10 concerning the cross-linking of OH-groups of different 1-hydroxymethylene-1,1-bisphosphonic acid molecules, if necessary by formation of never ending 3D networks by use of molecules with several 1-hydroxymethylene-1,1-bisphosphonic acid groups);

Cross-linking of 1-hydroxymethylene-1,1-bisphosphonic acids with OH groups containing polymers by use of epichlorhydrine as cross-linker (FIG. 11)[34,35];

Cross-linking of OH groups of 1-hydroxymethylene-1,1-bisphosphonic acids and if necessary of OH groups of the polymer with glutaraldehyde[36];

Cross-linking of OH groups of 1-hydroxymethylene-1,1-bisphosphonic acids and if necessary of OH groups of the polymer with melamine-formaldehyde cross-linker[37];

Cross-linking of OH groups of 1-hydroxymethylene-1,1-bisphosphonic acids and if necessary of OH groups of the polymers after reaction of the OH groups with Zcinnamon acid chloride by photocross-linking (cycloaddition) under UV light[38];

Cross-linking of OH groups of 1-hydroxymethylene-1,1-bisphosphonic acids and if necessary of OH groups of the polymer with polyvalent cations, e.g. $Ca^{2+}$[39];

In principal all types of cross-linking reactions which rely on cross-linking reactions of OH groups are applicable to the 1-hydroxymethylene-1,1-bisphosphonic acids according to the invention and if necessary OH groups containing polymers.

Covalent cross-linking prevents diffusion of the phosphonic acid compound out of the polymer and increases the mechanical stability of the blended films.

By the above described covalent cross-linking processes interpenetrating network (IPN) of the most different structure and composition can be formed. An example of this follows below. Exemplarily the following components are dissolved in an aprotic solvent such as N-methylpyrrolidone (NNM), N,N-dimethylacetamide (DMAc), N,N-dimethylformamide (DMF) or dimethylsulfoxide (DMSO): a polymer with sulfochloride groups, a cross-linker for sulfochloride groups like 4,4'-diaminodiphenylsulfone[40], a bifunctional 1-hydroxymethylene-1,1-bisphosphonic acid like 1,4-bis(1-hydroxymethylene-1,1-bisphosphonic acid)benzene and a cross-linker for the OH groups of 1-hydroxymethylene-1,1-bisphosphonic acid like glutaraldehyde. After making a homogeneous solution of all components, it is coated on a support with a doctor knife and the solvent is evaporated. An IPN is formed from the network of sulfochlorated polymer with difunctional amine and the network of 1,4-bis(1-hydroxymethylene-1,1-bisphosphonic acid)benzene and glutaraldehyde, that can be posttreated by mineral acid (0.1 to 80% $H_2SO_4$, 0.1 to 37% HCl or 0.1 to 85% phosphoric acid) and if necessary storage in water to remove an excess of mineral acid. An example of a hybride polymer network (HPN) is for example: in a dipolar-aprotic solvent (see above) the following components are dissolved: a polymer with sulfonate groups (—SO$_3$Me) and sulfinate groups (—SO$_2$Me) in the salt form with Me representing alkali metal cation, earth alkali metal cation, any ammonium ion, Ag$^+$-Ion, 3-(1-hydroxy-1,1-bisphosphonic acid)-pyridine, a α,ω-dihalogene alcane like 1,4-diiodine butane as cross-linker for the sulfinate groups (S-alkylation of the sulfinate groups[41]) and as cross-linker for the OH groups of 1-hydroxymethylene-1,1-bisphosphonic acid groups e.g. glutaraldehye[36]. After making a homogeneous solution of all components, it is coated on a support with a doctor blade and the solvent is evaporated. The formed HPN can be posttreated as follows: 1. Post-treatment in mineral acid (0.1 to 80% H$_2$SO$_4$, 0.1 to 37% HCl or 0.1 to 85% phosphoric acid) and if necessary 2. subsequent storage in water to remove an excess of mineral acid. The formed HPN consists of a covalent network of the polymer with sulfinate and sulfonate groups[42], whereby the sulfinate groups are cross-linked by S-alkylation with 1,4-diiodine butane and the network of 3-(1-hydroxy-1,1-bisphosphonic acid)-pyridine and glutaraldehyde. In addition ionic interactions exist between both networks between the pyridine groups of 3-(1-hydroxy-1,1-bisphosphonic acids)-pyridins and the sulfonate groups of the sulfonated polymer. Also the 1,4-diiodine butane cross-linker can crosslink also a part of the pyridine groups by alkylation, whereby mixed cross-linking bridges between the sulfinate groups and the pyridine groups are formed[43].

2. Production of Polymeric 1-hydroxymethylene-1,1-bisphosphonic acids from Carboxylated Polymers As already mentioned in part 1, it is known, that 1-hydroxymethylene-1,1-bisphosphonic acids can be made from acid chlorides R—COCl or acid anhydrides with tris(trimethylsilyl)phosphite and following hydrolysis of the silyl compound or by reaction of carbonic acids with phosphorous trichloride in phosphorous acid. Surprisingly it has been found that this reaction is successful also with polymeric carbonic acids/polymeric carbonic acid halides. Polymers modified with the 1-hydroxymethylene-1,1-bisphosphonic acid groups are also part of this invention. In FIG. 12 is shown the production of polysulfone Udel® modified with 1-hydroxymethylene-1,1-bisphosphonic acid groups from PSU-carbonic acid chloride. In principal with this synthetic method all carboxylated polymers can be reacted to polymers containing the 1-hydroxymethylene-1,1-bisphosphonic acid group.

Semi empirical calculation with the Software ACD Laboratories (pK$_A$ module) have shown surprisingly, that the acidity of 1-hydroxymethylene-1,1-bisphosphonic acids of the type R—C(PO$_3$H$_2$)$_x$(OH)$_y$ (here x=2 and y=1) as in FIG. 13 and FIG. 14 have a high acidity for phosphonic acids of pK$_A$=0 up to even pK$_A$=−1. Semi empirical calculation with the Software ACD Laboratories (pK$_A$ module) on polymeric model compounds containing the 1-hydroxymethylene-1,1-bisphosphonic acid groups have shown surprisingly that also the phosphonic acid groups of the corresponding polymers show a high acidity for phosphonic acids of about pK$_A$=0 (FIG. 15).

3. Production of polymeric 1-hydroxymethylene-1,1-bisphosphonic acids from Polymers Containing Carbonyl Groups (Aldehyde or Ceto Groups)

In the literature there is one publication describing the production of 1-hydroxymethylene-1,1-bisphosphonic acids from aldehyds[44]. It has been found surprisingly, that this reaction can be carried out with polymers carrying aldehyd groups. The reaction is shown exemplarily in FIG. 16 for an aldehyd-modified polythioethersulfone made from lithiated polythioethersulfone by reaction of N,N-dimethylformamide (DMF)[45]. Also surprisingly was that polymers carrying ceto groups (made for example as in[46]) can be modified with this method with 1-hydroxymethylene-1,1-bisphosphonic acid groups. An example of such a reaction is shown in FIG. 17.

In principal all common polymers containing the functional groups as mentioned in part 1 can be used. The following polymers are preferred:

polyolefines like polyethylene, polypropylene, polyisobutylene, polynorbornene, polymethylpentene, polyisoprene, poly(1,4-butadiene), poly(1,2-butadiene)

styrene(co)polymers like polystyrene, poly(methylstyrene), poly(α,β,β-trifluorstyrene), poly(pentafluorostyrene)

polyvinylalkohols and their copolymers polyvinylphenols and their copolymers poly(4-vinylpyridine), poly(2-vinylpyridine) and their copolymers perfluorinated ionomers like Nafion® or their SO$_2$Hal precursor of Nafion® (Hal=F, Cl, Br, I), Dow®-membrane, GoreSelect®-membrane sulfonated PVDF and/or the SO$_2$Hal-precursor, whereby Hal represents fluorine, chlorine, bromine or iodine (het)aryl main chain polymers like:
polyetherketones like polyetherketone PEK Victrex®, polyetheretherketone PEEK Victrex®, polyetherketoneketone PEKK, polyetheretherketoneketone PEEKK, polyetherketoneetherketoneketone PEKEKK Ultrapek® polyethersulfone like polysulfone Udel®, polyphenylsulfone Radel R®, polyetherethersulfone Radel A®, polyethersulfone PES Victrex® poly(benz)imidazole like PBI Celazol® and other oligomers and polymers containing the (benz)imidazole building block whereby the (benz)imidazole group can be in the main chain or in the polymer side chain polyphenyleneether like e.g. poly(2,6-dimethyloxyphenylene), poly(2,6-diphenyloxyphenylene)

polyphenylensulfide and copolymers poly(1,4-phenylene) or poly(1,3-phenylene), which can be modified in the side chain if necessary in with benzoyl-, naphtoyl- or o-phenyloxy-1,4-benzoyl groups, m-phenyloxy-1,4-benzoyl groups or p-phenyloxy-1,4-benzoyl groups.

poly(benzoxazole) and copolymers poly(benzthiazole) and copolymers poly(phtalazinone) and copolymers polyaniline and copolymers In principle all polymers especially all aryl main chain polymers are possible as base polymers for the polymers and polymer mixtures according to the invention. Also all possible block copolymers from these polymers, especially from aryl main chain polymers are possible, whereby the following types of block copolymers are preferred:

block copolymers made from cation exchange group modified blocks (—COX, POX$_2$, SO$_2$X with X=OH, OMet, NR$_2$, Met=metal cation, ammonium ion, OR with R=alkyl or aryl) and from unmodified blocks;

block copolymers made from OH group modified blocks and from unmodified block;

block copolymers made from blocks containing basic groups and from unmodified block; thereby the choice of basic groups is not limited, however preferred are heterocyclic or heteroaromatic, e.g. pyridyl-, imidazolyl-, benzimidazolyl- or pyrazolyl groups;

block copolymers, made from blocks modified with hydrophobic groups (e.g. trimethylsilyl —Si(CH$_3$)$_3$, trifluormethyl —CF$_3$, fluoride —F) and from blocks modified with cation exchange groups (—COX, —POX$_2$, —SO$_2$X with X=OH, OMet, NR$_2$, Met=metal cation, ammonium ion, OR with R=alkyl or aryl);

block copolymers from acidic blocks containing cation exchange groups and blocks containing basics groups;

block copolymers with OH groups containing blocks and acidic groups containing blocks;

block copolymers with OH groups containing blocks and basic groups containing blocks.

Any combination of the above mentioned block copolymers are possible.

Especially preferred polymer construction units and polymers are presented in der FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31, FIG. 32 and FIG. 33.

All common procedures for the phosphonation, carboxylation and/or sulfonation of the polymers can be applied. The most important procedures are presented in the following:

Sulfonation:

Process via metalation: first metalation (e.g. with n-butyl lithium), then reaction with a S-electrophil (SO$_2$, SO$_3$, SOCl$_2$, SO$_2$Cl$_2$), then if necessary reaction to the sulfonic acid (during the reaction of lithiated polymers with SO$_2$ sulfinates are formed, which are processed with an oxidation agent like H$_2$O$_2$, NaOCl, KMnO$_4$ etc. to the corresponding sulfonates[47], during the reaction of lithiated polymers with SO$_2$Cl$_2$ sulfochlorides are formed, which are hydrolysed with water, acids or bases to the corresponding sulfonic acids[48]).

Process via electrophilic sulfonationz: reaction of the polymer with concentrated sulfuric acid[49, 50], H$_2$SO$_4$—SO$_3$[51,52], chlorosulfonic acid, SO$_3$-triethylphosphate, SO$_3$-pyridine or other usual S-electrophiles.

Also other not explicitly described sulfonation processes can be used for the introduction of the sulfonic acid group.

Also polymers can be used according to the invention where sulfonated monomers are polymerised/polycondensated, e.g. as described by McGrath et al.[53,54,55].

Phosphonation

Apart from the processes according to the invention of the reaction of carbonic acid groups or carbonic acid derivatives like carbonic acid chloride or carbonic acid anhydride with phosphorous acid derivatives like PCl$_3$, phosphorous acid, phosphorous acid ester or tris(trimethylsilyl)phosphite, the usual procedures (phosphonation of the polymers[15,16,17,18] or phosphonation of monomers with subsequent polymerisation/polycondensation 4) can be applied. The best known reactions for the phosphonation of polymers are the Michaelis-Arbusov-reaction or the Michaelis-Becker-reaction. Also other here not explicitly described phosphonation processes can be used for the introduction of the phosphonic acid group. A possible process is the metalation of the polymer and the subsequent reaction of the metallated polymer with a halogenated phosphor acid ester or phosphonic acid ester (examples: Chlorphosphorsäurediaryl[16]- or -alkylester, 2-bromethanphosphonic acid dialkylester, 3-brompropanphosphonic acid dialkylester etc.).

Carboxylation

The polymers can be carboxylated with all common procedures. Picked is here the carboxylation of polymers via lithiated intermediates like the lithiation of polysulfon PSU Udel or the lithiation of polyphenylene oxide with subsequent reaction of the lithiated intermediate with solid or gaseous CO$_2$[56,57]. From the polymeric carbonic acid the corresponding acid halide can be made by reaction with thionylchloride (for the following reaction with e.g. tris(trimethylsilyl)phosphite to the corresponding 1-hydroxymethylene-1,1-bisphosphonic acid). Also the nucleophilic substitution reaction of electron poor halogene aromates with KCN and subsequent saponification of the CN group to the COOH group are mentioned here. Moreover methyl aromates can be reacted with potassium permanganate to the corresponding aromatic carbonic acids, e.g. 2-, 3- or 4-methylpyridines. Aliphatic carbonic acids are also obtainable by oxidation of aliphatic alcohols or aldehydes.

APPLICATION EXAMPLES

1. Preparation of an Ionically Cross-Linked Blend from a 1-Hydroxymethylene-1,1-Bisphosphonic Acid Containing a Pyridine Group and a Sulfonated Arylene Main-Chain Polymer Universal Procedure 3 g of the sulfonated arylene main-chain polymer in the SO$_3$Na form are dissolved in DMSO to a 10% solution. It is dissolved so much of the pyridine-containing 1-hydroxymethylene-1,1-bisphosphonic acid in the Na$^+$ form in DMSO to a 10% solution, that there is 1 sulfonate group per 1 pyridine group. Thereafter the solutions are mixed together. The combined solution is cast onto a glass plate to a thin film with a doctor knife. Then the DMSO is removed via evaporation at temperatures between 50 and 150° C. and, if necessary, low pressure of 800-10 mbar. Then the polymer film is removed under water from the glass plate. The polymer film is post-treated as follows:

1. In 1 to 50% base (alkali base such as NaOH, KOH, LiOH, etc., earth alkali such as Ba(OH)$_2$,Ca(OH)$_2$, aqueous ammonia or aqueous primary, secondary or tertiary amines or quaternary ammonium salts) at temperatures between 0 to 100° C. for 1 to 480 hours;
2. in 0 µl to 90% mineral acid (HCl, HBr, H$_2$SO$_4$, H$_3$PO$_4$) at temperatures from 0 to 100° for 2 to 480 hours;
3. in fully desalted water at temperatures from 0 to 100° C. for 2 seconds to 480 hours;
4. in 0.1 to 10 molar ZrOCl$_2$-solution at temperatures from 0 to 100° C. for 2 to 480 hours;
5. in fully desalted water at temperatures from 0 to 100° C. for 2 seconds to 480 hours;
6. in 0.1 to 90% H$_3$PO$_4$ at temperatures from 0 to 100° C. for 2 to 480 hours;
7. in fully desalted water at temperatures from 0 to 100° C. for 2 seconds to 480 hours.

In doing so discrete steps of the posttreatment can be skipped and/or the sequence (order) of the posttreatment can be exchanged in any order.

2. Preparation of a Covalently Cross-Linked Blend of an Aryl-1-Hydroxymethylene-1,1-bisphosphonic acid and a polymer which contains OH Groups, Whereas the Low-Molecular Aryl-1-Hydroxymethylene-1,1-Bisphosphonic Acid is Bound to the Polymer Via a Dialdehyde Cross-Linker Universal Procedure 3 g of a polymer which contains OH groups is dissolved in a dipolar-aprotic solvent or a protic solvent, e.g. in DMSO. Subsequently the low-molecular aryl-1-hydroxymethylene-1,1-bisphosphonic acid is dissolved in the same solvent, either in the H form or in the Na$^+$ form. Then the glutaraldehyde is added into the solution of the low-molecular 1-hydroxymethylene-1,1-bisphosphonic acid, namely per mole OH groups of the low-molecular aryl-1-hydroxymethylene- 1,1-bisphosphonic acid ½ mol glutaraldehyde. Subsequently the two solutions are mixed together.

The combined solution is cast onto a glass plate to a thin film with a doctor knife. Then the DMSO is removed via evaporational temperatures between 50 and 150° C. and, if necessary, low pressure of 800-10 mbar. Then the polymer film is removed under water from the glass plate. The polymer film is posttreated as follows:

1. In 1 to 50% base (alkali base such as NaOH, KOH, LiOH, etc., earth alkali such as $Ba(OH)_2$, $Ca(OH)_2$, aqueous ammonia or aqueous primary, secondary or tertiary amines or quaternary ammonium salts) at temperatures between 0 to 100° C. for 1 to 480 hours;
2. in 0.1 to 90% mineral acid (HCl, HBr, $H_2SO_4$, $H_3PO_4$) at temperatures from 0 to 100° for 2 to 480 hours;
3. in fully desalted water at temperatures from 0 to 100° C. for 2 to 480 hours;
4. in 0.1 to 10 molar $ZrOCl_2$-solution at temperatures from 0 to 100° C. for 2 to 480 hours;
5. in fully desalted water at temperatures from 0 to 100° C. for 2 seconds to 480 hours;
6. in 0.1 to 90% $H_3PO_4$ at temperatures from 0 to 100° C. for 2 to 480 hours;
7. in fully desalted water at temperatures from 0 to 100° C. for 2 seconds to 480 hours.

In doing so discrete steps of the posttreatment can be skipped and/or the sequence (order) of the posttreatment can be exchanged in any order.

3. Preparation of a Polymer Modified with 1-Hydroxymethylene-1,1-Bisphosphonic Acid Groups from a Polymeric Acid Chloride at the Example of PSU Udel Carboxylated PSU with two carboxylic groups per repeating unit is prepared according to [56] For the preparation of the PSU-diacidchloride the PSU-dicarboxylic acid is dissolved in a 9-fold excess of thionylchloride, referring to the mass of polymer. A small amount of N,N-dimethylformamide is added to this mixture, and the reaction mixture is refluxed for 72 hours. The PSU-diacidchloride is precipitated in a large excess of isopropanol, and excess thoinylchloride is washed out. The PSU-di-acidchloride is dired to weight constancy. Subsequently 10 g of the PSU-di-acidchloride are dissolved in 1000 ml anhydrous THF and filled in a dried 2000 ml gas flask which was silylated before. Under argon is cooled down to −78° C. Subsequently tris(trimethylsilylphosphite)e (per milliequivalent acidchloride 1 millimol tris(trimethylsilylphosphite)e) is added via syringe under vigorous stirring. At this temperature it is stirred for 2 hours, and subsequently it is warmed up to −10° C.

Then to the polymer a 10-fold excess is added (per 1 millimol tris(trimethylsilylphosphite)e 20 millimol methanol) to hydrolyze the silyl ester. The reaction solution volume is reduced to 10% of the initial volume via rotating of the THF, and subsequently the polymer is precipitated in 1 L of 1-molar HCl. The polymeric precipitate is filtered off, is washed with 1-molar HCl, and is taken up in 250 ml water. Subsequently the aqueous polymer mixture is dialyzed via dialysis tube. Then the water of the dialysate is evaporated, and the polymer is dried over $P_4O_{10}$ until weight constancy under oil pump vacuum.

[1] K. T. Adjemian, S. Srinivasan, J. Benziger, A. B. Bocarsly, *J. Power Sources* 2002, 109(2), 356-364
[2] S. C. Yeo, A. Eisenberg, *J. Appl. Polym. Sci.* 1977, 21, 875-898
[3] Q. Li et al., *Chem. Mat.* 15 (2003) 4896
[4] A. S. Aricò, P. Cretì, P. L. Antonucci, V. Antonucci, *Electrochem. Solid-State Lett.* 1998, 1(2), 66-68
[5] K. T. Adjemian, S. J. Lee, S. Srinivasan, J. Benziger, A. B. Bocarsly, *J. Electrochem. Soc.* 2002, 149(3), A256-A261
[6] I. Honma, H. Nakajima, O. Nishikawa, T. Sugimoto, S. Nomura, *J. Electrochem. Soc.* 2002, 149(10), A1389-A1392
[7] K. A. Mauritz, *Mat. Sci. Eng.* 1998, C6, 121-133
[8] C. Yang, S. Srinivasan, A. S. Aricò, P. Creti, V. Baglio, V. Antonucci, *Electrochem. Solid-State Lett.* 2001, 44, A31-A34
[9] G. Alberti, M. Casciola, *Annu. Rev. Mater. Res.* 2003, 33(1), 129-154
[10] R. F. Savinell; M. H. Litt; U.S. Pat. No. 5,525,436, Jun. 11, 1996
[11] J. S. Wainright, J.-T. Wang, D. Weng, R. F. Savinell, M. H. Litt, *J. Electrochem. Soc.* 1995, 142, L121
[12] G. Calandann, M. Sansone, B. Benicewicz, E. W. Choe, Oe. Uensal, J. Kiefer, D E 10246459 A1, 2004
[13] Y. L. Ma, J. S. Wainright, M. H. Litt, R. F. Savinell, *J. Electrochem. Soc.* 2004, 151(1) A8-A16
[14] M. Yamabe, K. Akiyama, Y. Akatsuka, M. Kato, *Eur. Polym. J.* 2000, 36, 1035-1041
[15] H. R. Allcock, M. A. Hofmann, C. M. Ambler, R. V. Morford, *Macromolecules* 2002, 35, 3484-3489
[16] B. Lafitte, P. Jannasch, *Journal of Polymer Science: Part A: Polymer Chemistry* 2005, 43, 273-286
[17] K. Jakoby, K. V. Peinemann, S. P. Nunes, *Macromol. Chem. Phys* 204, 61-67, 2003
[18] Xu and I. Cabasso, *J. Polym. Mater. Sci.* 1993, 120, 68
[19] K. D. Kreuer, S. J. Paddison, E. Spohr, M. Schuster, *Chem. Rev.* 2004, 104, 4637-4678
[20] H. R. Allcock, M. A. Hofmann, C. M. Ambler, S. N. Lvov, X. Y. Zhou, E. Chalkova, J. Weston, J., *J. Membr. Sci.* 2002, 201, 47-54
[21] Miyatake and Hay, *J. Polym. Sci.* 2001, 39, 3770
[22] J. Kerres, F. Schönberger, unveröffentlichte Ergebnisse
[23] Gerard R. Kieczykowski, Ronald B. Jobson, David G. Melillo, Donald F. Reinhold, Victor J. Grenda, and Ichiro Shinkai, *J. Org. Chem.* 1995, 60, 8310-8312
[24] Blum, H.; Worms, K. U.S. Pat. No. 4,327,039, 1982
[25] Blum, H.; Worms, K. U.S. Pat. No. 4,407,761, 1983
[26] Rosini, S.; Staibano, G. U.S. Pat. No. 4,621,077, 1986.
[27] Jary, J.; Rihakova, V.; Zobacova, A. U.S. Pat. No. 4,304,734, 1981
[28] Marc Lecouvey, Isabelle Mallard, Théodorine Bailly, Ramon Burgada and Yves Leroux, *Tetrahedron Letters* 2001, 42, 8475-8478
[29] Sekine, M.; Hata, T. *J. Chem. Soc. Chem. Commun.* 1978, 285
[30] Lecouvey, M.; Leroux, Y. *Heteroatom Chem.* 2000, 11(7), 556-561
[31] Sekine, M.; Okimoto, K.; Yamada, K.; Hata, T. *J. Org. Chem.* 1981, 46, 2097-2107
[32] Guenin, E.; Degache, E.; Liquier, J.; Lecouvey, M. *Eur. J. Org. Chem.* 2004, 2983-2987
[33] Luo, L.-B.; Yu, S.-H.; Qian, H.-S.; Zhou, T. *J. Am. Chem. Soc.* 2005, 127, 2822
[34] Wang, Z.; Luo, J.; Zhu, X. X.; Jin, S.; Tomaszewski, M. J. *J. Comb. Chem.* 2004, 6, 961-966
[35] Wan, Y.; Huang, W. Q.; Wang, Z.; Zhu, X. X. *Polymer* 2004, 45(1), 71-77
[36] Zhao, D.; Liao, G.; Gao, G.; Liu, F. *Macromolecules* 2006, published on Web Jan. 12, 2006, http://pubs.acs.org/cgi-bin/asap.cgi/mamobx/asap/pdf/ma0524191.pdf
[37] Benson, M. T. *Ind. Eng. Chem. Res.* 2003, 42, 4147-4155
[38] Hu, Y.; Gamble, V.; Painter, P. C.; Coleman, M. M. *Macromolecules* 2002, 35, 1289-1298
[39] Bonapasta, A. A.; Buda, F., Colombet, P.; Guerrini, G. *Chem. Mater.* 2002, 14, 1016-1022
[40] R. Nolte, K. Ledjeff, M. Bauer, R. Mijlhaupt, R., *J. Memb. Sci.* 1993, 83, 211-220
[41] Kerres, J.; Cui, W.; Junginger, M. *J. Memb. Sci.* 1998, 139, 227-241
[42] Kerres, J.; Zhang, W.; Cui, W. *J. Polym. Sci.: Part A: Polym. Chem.* 1998, 36, 1441-1448
[43] Kerres, J.; Zhang, W.; Tang, C. M. U.S. Pat. No. 6,767,585; granted at 27 Jul. 2004
[44] Y. L. Xie, Q. Zhu, X. R. Qin, Y. Y. Xie, *Chinese Chemical Letters* 2003, 14(1), 25-28
[45] M. D. Guiver, H. Zhang, G. P. Robertson, Y. Dai, *Journal of Polymer Science, Part A: Polymer Chemistry* 2001, 39, 675-682
[46] J. Kerres, A. Ulirich, T. Haring, U.S. Pat. No. 6,590,067; granted at 8.7.2003; European Patent EPI 105 433 BI; granted at 27 Oct. 2004
[47] J. Kerres, W. Cui, P. Reicble, J. Polym. Sci.: Part A: Polym. Chem. 34, 2421-2438 (1996)
[48] J. A. Kerres, A. J. van Zyl, J. Appl. Polym. Sci. 74, 428-438 (1999)
[49] F. Helmer-Metzmann, F. Osan, A. Schneller, H. Ritter, K. Ledjeff, R. Nolte, R. Thorwirth, E P 0574 791 B1, 22 Dec. 1999

[50] S. Kaliuguine, S. D. Mikhailenko, K. P. Wang, P. Xing, G. P. Robertson, M. D. Guiver, Catalysis Today 2003, 82, 213-222

[51] H. H. Ulrich, G. Rafler, *Angew. Makromol. Chem.* 1998, 263, 71-78

[52] J Kerres, C.-M. Tang, C. Graf, *Ind. Eng. Chem. Res.* 2004, 43(16), 4571-4579 (available via URL: http://pubs.acs.org/cgibin/asap.cgi/iecred/asap/pdf/ie030762d.pdf)

[53] Y. S. Kim, F. Wang, M. Hickner, T. A. Zawodzinski, J. E. McGrath, *J. Membr. Sci.* 2003, 212, 263

[54] W. L. Harrison, F. Wang, J. B. Mecham, V. A. Bhanu, M. Hill, Y. S. Kim, J. E. McGrath, *J. Polym. Sci., Part A: Polym. Chem.* 2003, 41,2264

[55] Y. S. Kim, M. A. Hickner, L. Dong, B. S. Pivovar, J. E. McGrath, *J. Membr. Sci.* 2004, 243, 317

[56] Guiver, M. D. *Ph.D. Dissertation*, Carletown University 1987, Ottawa-Ontario, Canada

[57] Beihoffer, T. W.; Glass, J. E. *Polymer* 1986, 27, 1626-32

The invention claimed is:

1. A membrane comprising:
   (a) one or more polymers having functional groups selected from the group consisting of cation exchange groups and their non-ionic precursors of the type $SO_2X$, $POX_2$, $COX$, basic primary, secondary and tertiary amino groups, imidazole groups, pyridine groups, pyrazole groups and OH groups where X is a halogen, —OH, —OMe, —$NR_1R_2$, or —$OR_1$ where Me is selected from the group consisting of metal cations, transition metal cations, and ammonium cations, and wherein $R_1$ and $R_2$ are selected from the group consisting of H, aryl- and alkyl- radicals; and
   (b) a low molecular weight hydroxymethylene-oligo-phosphonic acid $R—C(PO_3H_2)_x(OH)_y$ where R is selected from the group of organic radicals and x, y are integers.

2. The membrane of claim 1 wherein in x is 2 and y is 1.

3. The membrane of claim 1 wherein the low molecular weight hydroxymethylene-oligo-phosphonic acid s prepared from one or more carbonic acids reacting with $PCl_3$ or $H_3PO_3$, followed by hydrolysis with $H_2O$.

4. The membrane of claim 1 wherein the low molecular weight hydroxymethylene-oligo-phosphonic acid is prepared from reacting one or more carbonic acid chlorides or carbonic acid anhydrides with tris(trimethylsilylphosphite) with subsequent hydrolysis by methanol.

5. The membrane of claim 1, wherein R of the hydroxymethylene-oligo phosphonic acid comprises an aliphatic or aromatic basics group, which enters into an ionic interaction with the acidic groups of the polymers or the polymer mixture.

6. The membrane of claim 5, wherein the aliphatic or aromatic basic group is selected from the group consisting of primary, secondary or tertiary basic amino groups, quaternary ammonium salts, imidazole groups, pyrazole groups, pyridyl radicals, and basic heterocyclic or heteroaromatic radicals.

7. The membrane of claim 1, wherein molecules of the low molecular hydroxymethylene-oligo-bisphosphonic acid are covalently cross-linked with —OH groups among themselves.

8. The membrane of claim 1, wherein molecules of the low molecular hydroxymethylene-oligo-bisphosphonic acid are covalently cross-linked with —OH groups of the polymer.

9. The membrane of claim 7, wherein the cross-linking are performed using a cross-linker selected from the group consisting of: (a) $AgNO_3$ in a mixture including elemental silver nanoparticles; (b) epichlorohydrine; (c) glutaraldehyde and di-aldehyds; (d) melamine-formaldehyde; (e) cinnamon acid chloride; and (f).alpha to omega.-dihalogene alkanes or dihalogene aromates Hal-R-Hal, where Hal is a halogen.

10. The membrane of claim 2, prepared by reacting (a) polymers containing carbonic acid groups or carbonic acid halide groups with phosphite compounds or (b) polymeric aldehydes with phosphorous acid ester under amine catalysis, under an oxidation of an intermediate hydroxyphosphonic acid with $MnO_2$ or another oxidation agent.

11. The membrane of claim 10, wherein the polymers comprise one or more of polyolefins like polyethylene, polypropylene, polyisobutylene, polynorbornene, polymethylpentene, polyisoprene, poly(1,4-butadiene), poly(1,2-butadiene), styrol(co)polymers like polystyrene, poly(methylstyrene), poly(.alpha., .beta., .beta.-trifluorstyrene), poly (pentafluorostyrene), polyvinylalcohol and their copolymers, polyvinylphenol and their copolymers, poly(4-vinylpyridine), poly(2-vinylpyridine) and their copolymers, perfluorinated ionomers or their $SO_2Hal$ precursors, Dow R-membrane, Gore Select.R-membrane, sulfonated PVDF and/or their $SO_2Hal$ precursors, where Hal is a halogen, (Het)aryl main chain polymers, polyethersulfone, oligomers and polymers containing the (benz)imidazole building block, polyphenyleneether, whether or not modified in the side chain with benzoyl-, naphtoyl- or o-phenyloxy-1,4-benzoyl groups, m-phenyloxy-1,4-benzoyl groups or p-phenyloxy-1, 4-benzoyl groups, poly(benzoxazole) and copolymers, poly (benzthiazole) and copolymers, poly(phtalazinone) and copolymers, polyaniline and copolymers.

\* \* \* \* \*

UNITED STATES PATENT AND TRADEMARK OFFICE
CERTIFICATE OF CORRECTION

PATENT NO. : 8,637,174 B2  
APPLICATION NO. : 12/278245  
DATED : January 28, 2014  
INVENTOR(S) : Häring et al.

Page 1 of 1

It is certified that error appears in the above-identified patent and that said Letters Patent is hereby corrected as shown below:

On the title page, item [57], line 8

"$PDX_2$" should be --$POX_2$--

In the Claims

Column 11, line 35, Claim 3

"acid s" should be --acid is--

Column 12, line 31, Claim 11

".alpha., .beta., .beta.-trifluorstyrene" should be --.alpha.,.beta.,.beta.-trifluorstyrene--

Signed and Sealed this  
Twenty-third Day of September, 2014

Michelle K. Lee  
*Deputy Director of the United States Patent and Trademark Office*